US012568281B1

(12) United States Patent
Alagheband

(10) Patent No.: US 12,568,281 B1
(45) Date of Patent: Mar. 3, 2026

(54) SEARCH RANKING MEDIA CONTENT ITEMS

(71) Applicant: Block, Inc., San Francisco, CA (US)

(72) Inventor: Mohammadreza Alagheband, Oppegård (NO)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/402,637

(22) Filed: Jan. 2, 2024

(51) Int. Cl.
*H04N 5/445* (2011.01)
*H04N 21/482* (2011.01)

(52) U.S. Cl.
CPC .............................. *H04N 21/4826* (2013.01)

(58) Field of Classification Search
CPC ................................................ H04N 21/4826
USPC .......................................................... 725/44
See application file for complete search history.

(56) References Cited

U.S. PATENT DOCUMENTS

| | | | | |
|---|---|---|---|---|
| 7,849,070 | B2 * | 12/2010 | Fassett ..................... | G06F 16/68 |
| | | | | 707/731 |
| 9,652,539 | B2 * | 5/2017 | Chowdhury ............. | G06F 16/48 |
| 11,269,898 | B1 * | 3/2022 | Salaka ................... | G06N 20/20 |
| 11,669,568 | B2 * | 6/2023 | Chen ..................... | G11B 27/102 |
| | | | | 700/94 |

| | | | | |
|---|---|---|---|---|
| 2013/0339434 | A1 * | 12/2013 | Nogues ............. | G06F 16/24578 |
| | | | | 709/204 |
| 2015/0026078 | A1 * | 1/2015 | Weich ..................... | G06F 21/31 |
| | | | | 705/310 |
| 2017/0308794 | A1 * | 10/2017 | Fischerström .......... | G06F 16/48 |
| 2019/0258335 | A1 * | 8/2019 | Beaumier ........ | H04N 21/41415 |
| 2021/0084369 | A1 * | 3/2021 | Neumeier .......... | H04N 21/4667 |
| 2021/0365511 | A1 * | 11/2021 | Matloub ............. | G06F 16/9538 |
| 2022/0124414 | A1 * | 4/2022 | Rao ..................... | G06F 16/9535 |
| 2022/0244824 | A1 * | 8/2022 | Cielak .................. | G06F 3/0482 |
| 2023/0153349 | A1 * | 5/2023 | Allen ................... | H04N 21/233 |
| | | | | 707/754 |
| 2024/0177256 | A1 * | 5/2024 | Sergay ................. | G06Q 10/067 |

\* cited by examiner

*Primary Examiner* — Sahar Aqil Riaz

(74) *Attorney, Agent, or Firm* — IP Spring

(57) ABSTRACT

A technique for search ranking media content items is described. In accordance with the described techniques a media content item previously absent from a media content library is received. A popularity value of the media content item is estimated based on the artist popularity value and one or more album popularity values for one or more albums of the artist released prior to the media content item and based on an elapsed duration after receiving the media content item satisfying a threshold duration. A search request for a media content item is received. One or more search results are populated in response to the search request. The one or more search results include the media content item and one or more additional media content items ranked based on the estimated popularity value of the media content item and respective popularity values of the one or more additional media content items.

20 Claims, 11 Drawing Sheets

1000 —

1002
RECEIVE, BY A MEDIA CONTENT PLATFORM, A MEDIA CONTENT ITEM PREVIOUSLY ABSENT FROM A MEDIA CONTENT LIBRARY OF THE MEDIA CONTENT PLATFORM, THE MEDIA CONTENT ITEM ASSOCIATED WITH AN ARTIST POPULARITY VALUE OF AN ARTIST OF THE MEDIA CONTENT ITEM

1004
ESTIMATE, BASED ON AN ELAPSED DURATION AFTER RECEIVING THE MEDIA CONTENT ITEM SATISFYING A THRESHOLD DURATION, A POPULARITY VALUE OF THE MEDIA CONTENT ITEM BASED ON THE ARTIST POPULARITY VALUE AND ONE OR MORE ALBUM POPULARITY VALUES FOR ONE OR MORE ALBUMS OF THE ARTIST RELEASED PRIOR TO THE MEDIA CONTENT ITEM, THE ONE OR MORE ALBUM POPULARITY VALUES BEING WEIGHTED BASED ON A RECENCY OF RELEASE OF THE ONE OR MORE PREVIOUS ALBUMS BY THE ARTIST

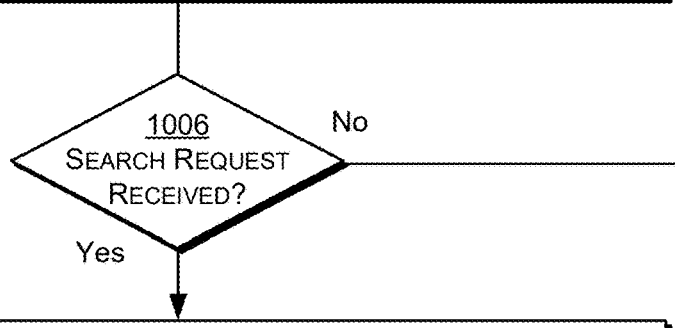

1006
SEARCH REQUEST RECEIVED?

No

Yes

1008
POPULATE ONE OR MORE SEARCH RESULTS IN RESPONSE TO THE SEARCH REQUEST, THE ONE OR MORE SEARCH RESULTS INCLUDING THE MEDIA CONTENT ITEM AND ONE OR MORE ADDITIONAL MEDIA CONTENT ITEMS RANKED BASED ON THE ESTIMATED POPULARITY VALUE OF THE MEDIA CONTENT ITEM AND RESPECTIVE POPULARITY VALUES OF THE ONE OR MORE ADDITIONAL MEDIA CONTENT ITEMS

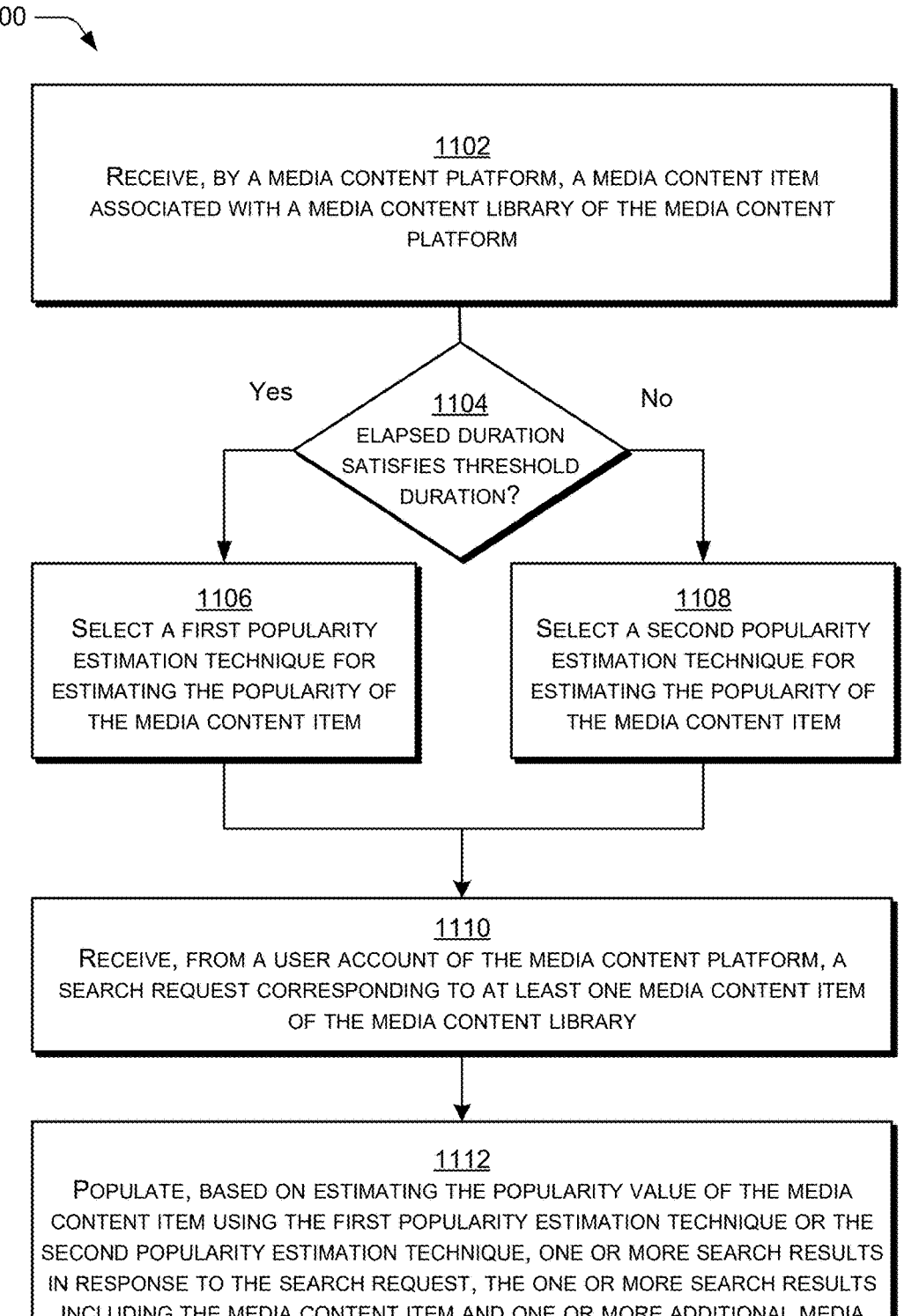

1102
RECEIVE, BY A MEDIA CONTENT PLATFORM, A MEDIA CONTENT ITEM ASSOCIATED WITH A MEDIA CONTENT LIBRARY OF THE MEDIA CONTENT PLATFORM

Yes

1104
ELAPSED DURATION SATISFIES THRESHOLD DURATION?

No

1106
SELECT A FIRST POPULARITY ESTIMATION TECHNIQUE FOR ESTIMATING THE POPULARITY OF THE MEDIA CONTENT ITEM

1108
SELECT A SECOND POPULARITY ESTIMATION TECHNIQUE FOR ESTIMATING THE POPULARITY OF THE MEDIA CONTENT ITEM

1110
RECEIVE, FROM A USER ACCOUNT OF THE MEDIA CONTENT PLATFORM, A SEARCH REQUEST CORRESPONDING TO AT LEAST ONE MEDIA CONTENT ITEM OF THE MEDIA CONTENT LIBRARY

1112
POPULATE, BASED ON ESTIMATING THE POPULARITY VALUE OF THE MEDIA CONTENT ITEM USING THE FIRST POPULARITY ESTIMATION TECHNIQUE OR THE SECOND POPULARITY ESTIMATION TECHNIQUE, ONE OR MORE SEARCH RESULTS IN RESPONSE TO THE SEARCH REQUEST, THE ONE OR MORE SEARCH RESULTS INCLUDING THE MEDIA CONTENT ITEM AND ONE OR MORE ADDITIONAL MEDIA CONTENT ITEMS RANKED BASED ON THE ESTIMATED POPULARITY VALUE OF THE MEDIA CONTENT ITEM AND RESPECTIVE POPULARITY VALUES OF THE ONE OR MORE ADDITIONAL MEDIA CONTENT ITEMS

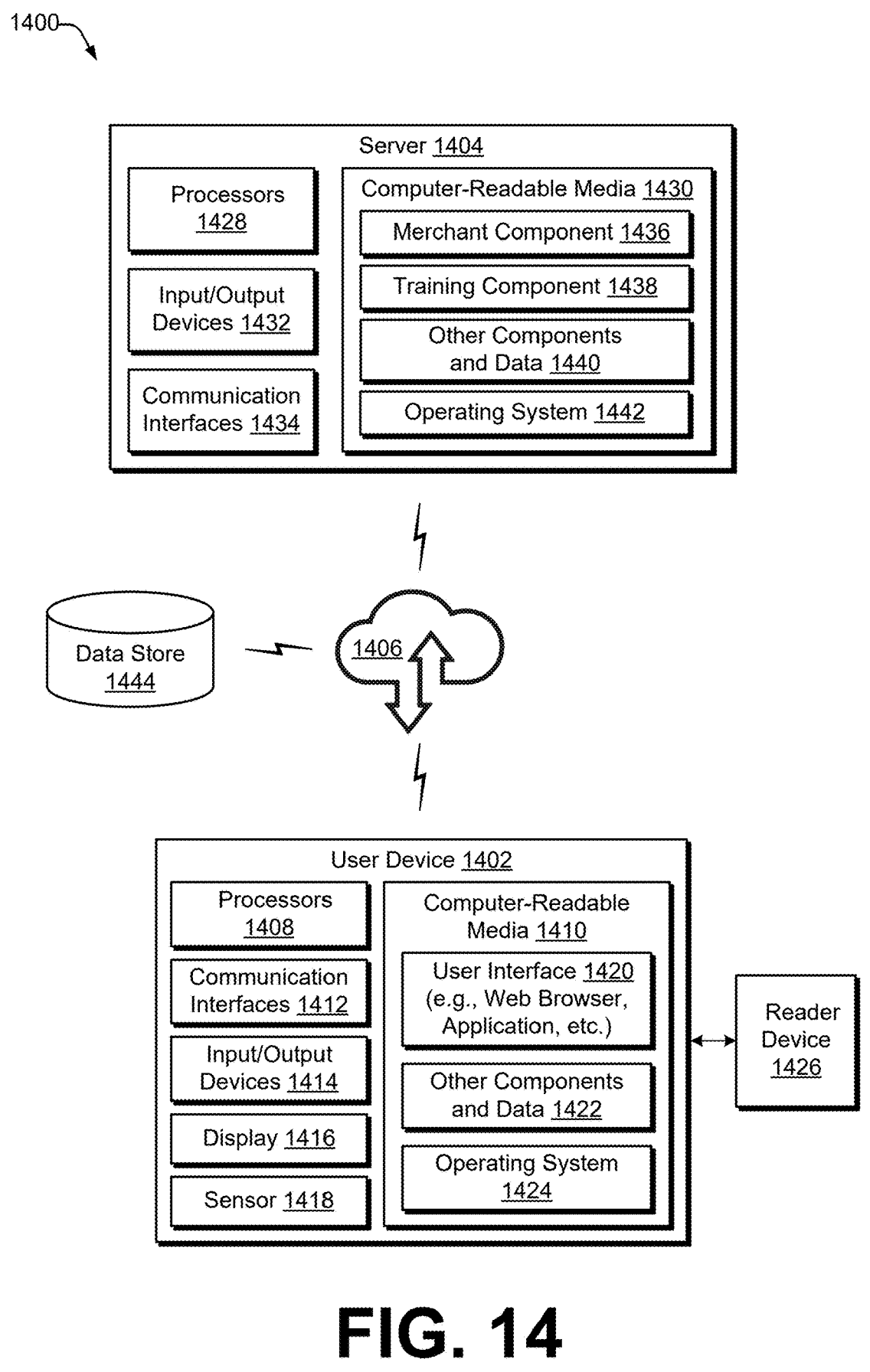

Server 1404

Processors 1428

Input/Output Devices 1432

Communication Interfaces 1434

Computer-Readable Media 1430

Merchant Component 1436

Training Component 1438

Other Components and Data 1440

Operating System 1442

Data Store 1444

1406

User Device 1402

Processors 1408

Communication Interfaces 1412

Input/Output Devices 1414

Display 1416

Sensor 1418

Computer-Readable Media 1410

User Interface 1420 (e.g., Web Browser, Application, etc.)

Other Components and Data 1422

Operating System 1424

Reader Device 1426

FIG. 14

SEARCH RANKING MEDIA CONTENT ITEMS

TECHNICAL FIELD

Media content platforms can be implemented as dedicated applications as well as web pages and enable entities to provide the media content for subsequent streaming by other entities. For example, an artist and/or a distributor can provide music or videos to the media content platform for streaming by users who visit and/or subscribe to the media content platform. Data associated with the entities that utilize the media content platform as well as the entities that produce the media content can be stored and analyzed to enable features (e.g., search features) of the media content platform.

BRIEF DESCRIPTION OF THE DRAWINGS

FIGS. 10 and 11 depict procedures in an example implementation of search ranking media content items in accordance with one or more implementations.

FIG. 14 depicts an illustrative block diagram illustrating a system for performing search ranking media content items techniques described herein, in accordance with one or more implementations.

DETAILED DESCRIPTION

Figure 1:
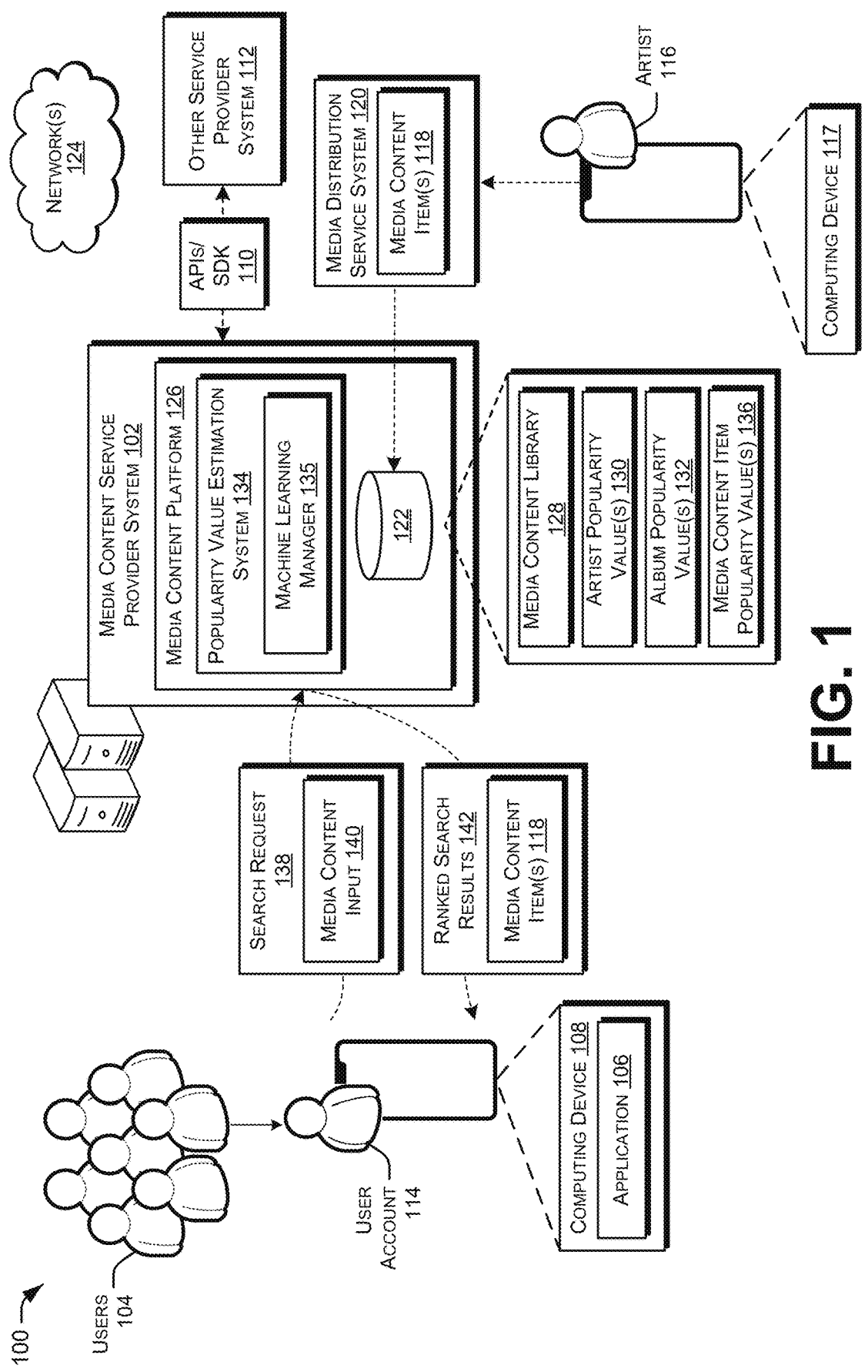
FIG. 1 is a block diagram of a non-limiting example environment for search ranking media content items in accordance with one or more implementations.

Disclosed methods and systems include a media content service provider system and/or a media content platform, which surfaces newly released media content items in search results of the media content service provider by using an estimated popularity rather than an actual popularity of the newly released media content items. The estimated popularity is different from the actual popularity which is used to position other media content items that are not "new" in the search results. In this way, a search feature of the media content service interleaves newly released media content items with older media content items with established popularities by using the estimated popularity of the newly released media content items. This avoids the pitfalls of conventional systems (e.g., the "cold start" problem), which assemble search results for newly released media content items and older media content items using a same popularity metric. By assembling search results in this way, e.g., using a same popularity metric, conventional techniques position new media content items at positions in search results that require further navigation by a user, which involves receiving and processing more user inputs at the computing device level (e.g., an adjustment of search terms to initiate additional search(es)) and consuming bandwidth of communication channels between a user computing device and the media content platform to perform updated searches and find a particular new media content item.

In various scenarios, users interact with a media content platform to stream media content, such as audio media content. For example, a user can interact with the media content platform to listen to a music track, a music artist, a podcast, or any other audio and/or visual media content. The media content platform provides a search feature for the users to search for tracks, artists, albums, and more. A user can input a string value and/or character values to the search feature (e.g., by typing in the string and/or characters or speaking a query), and the search feature can access a database of the media content platform to acquire search results that are relevant for the input. For example, the media content platform can compare the string value and/or the character value to values in the database to find matching media content items to output as search results. The search feature can populate search results in a list format, where the search results are ranked in the list according to a popularity of the search result. For example, if the search results include two tracks, and a first track has a greater numerical quantity of listens or searches than a second track, the first track can be ranked higher on the list than the second track.

If an artist releases a new track, however, there is a time duration in which the track has a minimal numerical quantity of listens or searches (e.g., due to the limited amount of time on the media content platform). This time duration can be referred to as a cold start period. Thus, even if the artist and/or other tracks by the artist are popular, the search feature populates the new track with a relatively low ranking on the list during the cold start period in conventional systems. Ranking new tracks relatively low on a list can result in frustration for a user of the media content platform due to an inability to select a desired track and/or delays in searching for a desired track, such as when a new track is released on a particular day and searches for the track are initiated with queries that include partial information about the track (e.g., a first word of the track's title). The delays in populating a desired track on a ranked list of search results also causes inefficient use of computational resources due to users performing additional searches (e.g., inputting additional characters or string values) to find a newly released track.

The techniques described herein relate to search ranking of newly released media content items to accurately rank a newly released media content item based on an estimated popularity for a defined duration (e.g., the cold start period) after the media content item is added to a media content library and/or released by an artist. In accordance with the described techniques, a media content platform receives a media content item previously absent from a media content library of the media content platform. For example, the media content platform receives a newly released music track or album from a media distribution service system to provide to the media content platform. The media content item is associated with an artist, and the artist has an associated artist popularity value in a specified geographic region, e.g., a geographic region of a user of the media content platform. The associated artist popularity value may be based on the artist's historical popularity in the geographic region, e.g., in connection with one or more previously released media content items or albums. For instance, the media content platform can determine or estimate a popularity value of the newly released media content item using the artist popularity value and/or album popularity values of previous albums of the artist, e.g., relative to albums of other artists in the geographic region. In some examples, the album popularity values are weighted according to a recency of release of the previous albums, such that albums that are released more recently have a relatively higher weighted contribution to the album popularity value and albums that are released less recently have a relatively lower weighted contribution to the album popularity value.

In one or more scenarios, a user of the media content platform provides input to search for media content, e.g., provides input to formulate a search query. Based on the search query, the media content platform populates search results (e.g., media content items from the media content library) based on some measure of matching the search query and also ranks the search results according to popularity values of various media content items. For example, if the user provides a search query that matches a media content item that is within a cold start period (e.g., newly released or recently released), then the media content platform can use an estimated popularity value for the media content item to boost a ranking of the media content item in a list of search results, such that the media content item from the search results is positioned higher in the search results than the media content item would be based on actual popularity, enabling the user to more easily locate and select the media content item from the search results. As such, the described techniques and systems solve problems faced by media content platforms by decreasing the time and manual input from a user of a media content platform to locate media content items that are newly released. By decreasing the amount of manual input, a user device of the user searching for the media content processes fewer inputs thereby decreasing the use of processing resources (e.g., processor cores, memory, etc.) and the burden on such resources, which can improve battery life of the user device and/or enable the user device to perform other tasks.

Moreover, the described techniques and systems reduce the computational resources used for searching for newly released media content items by accurately ranking the newly released media content items for selection by a user searching for the newly released media content items. That is, accurately ranking the newly released media content items can reduce a search time and/or a numerical quantity of search inputs to the media content platform, which reduces processing performed by the media content platform as well as bandwidth due to communications between the search feature and a media content library of the media content platform. This contrasts with conventional approaches where a popularity value for a newly released media content item is assigned arbitrarily (e.g., starts at zero, or relatively low), and users are unable to obtain the newly released media content item via the search feature and/or are forced to provide additional input to add string values and/or character values (or delete some such values) to obtain the media content item via the search feature.

Although the techniques discussed herein are described in relation to "artists" and "users," the techniques are applicable to other entities, such as to facilitate searching of media content items released by other entities. Example entities for which the described media content platform may be useful include but are not limited to producers, distributors, labels, actors and actresses, athletes, crafts people, personalities, businesspeople, academics, fitness personalities, merchandisers, chefs, restaurateurs, facility or venue owners/managers, fashion designers, influencers, models, and promoters, to name just a few.

FIG. 1 is a block diagram of a non-limiting example environment 100 for search ranking media content items. In one embodiment, the environment 100 includes a media content service provider system 102 and a population of users 104 of the media content service provider system 102. In one or more implementations, the media content service provider system 102 is a music service provider system that, at least in part, provides media content (e.g., by streaming media such as by streaming music or streaming video) to a population of at least one of the users 104. In one or more implementations, for instance, the media content service provider system 102 is, or includes, an application 106. The application 106 can be a subscription-based digital media streaming application, which executes on a computing device 108. Example computing devices 108 include, but are not limited to, a mobile phone, a tablet, a computer, or other computing device. In some examples, media content is stored on a remote server, such as on a server implementing and/or associated with the media content service provider system 102. In this way, the media content items are either streamed offline (cached on the local computing device) or streamed online with content streaming in packets. Hence, the media content service provider system 102 may be a digital audio streaming service (e.g., for music and/or podcasts), a digital video streaming service, or a streaming service that provides streaming of various different types of digital media or multimedia. Such a streaming service may be subscription-based, to provide for the users 104 to stream digital media content items (e.g., songs, podcasts, and/or videos) on-demand from a centralized library provided by the media content service provider system 102.

Additionally or alternatively, the media content service provider system 102 is or includes at least one application communicatively coupled, such as through dedicated application programming interfaces (APIs) or software development kits (SDKs) 110 to at least one other service provider system 112 that is or deploys one or more application(s), such as a streaming application, content creation application, payment application, mapping application, loyalty application, social media application, generative artificial intelligence (AI) application, and so on.

The users 104 access the media content service provider system 102 via one or more computing devices, which execute the application 106 as described herein. In at least one implementation, the users 104 have user accounts 114 with the media content service provider system 102, although in at least some cases, one or more of the users 104 have not signed up for user accounts 114 with the media content service provider system 102. The user account 114 can include data related to a user 104, such as a user account name, a password, a geographical location, or region of the user 104, an age of a user 104, and/or one or more preferences of a user 104, among other data.

In the illustrated example, computing device 108 is depicted with the application 106. The computing device 108 is associated with a user account 114 of the media content service provider system 102. For example, the computing device 108 can run an application 106 that stores and/or implements the user account 114. Thus, one example user 104 of the media content service provider system 102 has the user account 114 with the media content service provider system 102 and accesses the media content service provider system 102 via the computing device 108, e.g., using the application 106. By enabling user interaction with various user interfaces of the application 106, the computing device 108 provides the user 104 having the user account 114 with access to the various functionalities of the media content service provider system 102.

In one or more implementations, one or more users of the media content service provider system 102 are designated as artists (e.g., the artist 116), which collectively form a population of artists (not shown). The artist 116 can also use computing devices or interfaces to interact with the media content service provider system 102. The population of artists generate media content for the media content service provider system 102, for other service providers (e.g., for one or more streaming services), for live performances, and/or for exposure to an audience in various ways. For example, an artist 116 can generate, or produce, media content items 118 including music tracks, music albums, music videos, podcasts, and/or other audio or video media content.

In various implementations, the artists 116 can interact with a media distribution service system 120 to send media content items 118 to a media content service provider system 102. That is, the artist 116 (or another user associated with the artist such as an agent, manager, producer, etc.) can provide media content items 118 from a computing device or cause media content items 118 to be provided to storage 122 of the media content service provider system 102 via a media distribution service system 120. The media distribution service system 120 can filter the media content items 118 prior to sending the media content items 118 to the media content service provider system 102. For example, the media distribution service system 120 can compare parameters of the media content items 118 to a set of criteria, including a quality of the media content items 118, a duration of the media content items 118, metadata accuracy of the media content items 118, licenses for distribution of the media content items 118, explicit or inappropriate content, duplication of content, originality of content, and spam or fraud of the media content items 118, among other criteria. If the media content items 118 satisfy the criteria, the media distribution service system 120 can send the media content items 118 to the media content service provider system 102 for processing and/or for further distribution to the users 104.

In one or more implementations, the service provider system 102, the media distribution service system 120, the computing device 108 of the user 104, and a computing device 117 of the artist 116, are connected via one or more network(s) 124, examples of which include the Internet and cellular networks.

Computing devices that implement the environment 100 are configurable in a variety of ways. A computing device, for instance, is configurable as a server, a desktop computer, a laptop computer, a mobile device (e.g., assuming a handheld configuration such as a tablet or mobile phone), an IoT device, a wearable device (e.g., a smart watch), an AR/VR device, and so forth. Thus, a computing device ranges from full resource devices with substantial memory and processor resources to low-resource devices with limited memory and/or processing resources. Although in instances in the following discussion reference is made to a computing device in the singular, a computing device may also represent any number of different computing devices, such as multiple servers of a server farm utilized to perform operations "over the cloud" as further described in relation to FIG. 12.

The media content service provider system 102 is depicted including a media content platform 126 and storage 122. The storage 122 is depicted storing a media content library 128, artist popularity values 130, and album popularity values 132, which is described in further detail with respect to FIG. 3. The storage 122 may be configured in various ways to store data. For instance, the storage 122 can include or otherwise have access to one or more databases, virtual storage, and so forth. Alternatively, or in addition, the storage 122 includes one or more data tables, data stores, and so on, that may be physically or logically separated, e.g., physically remote from one another and/or partitioned to store different data. In some examples, the media content library 128 includes hundreds, thousands, hundreds of thousands, or millions (and so on) of media content items 118 and corresponding metadata of the media content items 118 (artist, release date, album, genre, beats per minute, etc.).

The media content platform 126 is depicted including a popularity value estimation system 134, which can access the storage 122. In one or more implementations, the popularity value estimation system 134 calculates an estimated popularity value for a media content item 118 received from the media distribution service system 120. The popularity value estimation system 134 calculates the estimated popularity value for media content items 118 that are within a threshold duration from being received from the media distribution service system 120 and/or that are within a threshold duration from a release date of the media content item 118 (e.g., are within a cold start period). In some examples, the popularity value estimation system 134 includes a machine learning manager 135. The machine learning manager 135 may be configured to implement artificial intelligence to estimate the popularity value. For example, the machine learning model manager 135 may train one or more machine learning models by updating parameters of the models using a training dataset. The machine learning manager 135 may utilize the trained machine learning models to generate the estimated popularity value, which is described in further detail with respect to FIG. 3. The popularity value estimation system 134 calculates the estimated popularity value by obtaining data from the storage 122, including an artist popularity value for an artist 116 of a media content item 118 and/or one or more album popularity values for albums previously released by the artist 116 of the media content item 118, which is described in further detail with respect to FIGS. 2 and 3.

In some examples, the artist popularity values 130 and/or the album popularity values 132 can depend on a geographical region of the user 104 of the user account 114. For example, the computing device 108 can determine location information indicating a geographical region of the user 104, e.g., via user input, via location tracking information from the application 106, via location tracking information from the computing device 108 such as by using GPS and/or triangulation, or the like. The geographic region can include a continent, a country, a state, a city, or any other geographic region of the computing device 108 and by association the user 104 having the user account 114. In some examples, a user 104 can specify a geographic region via a user interface of the computing device 108, as described in further detail with respect to FIG. 9. An artist 116 can have a different artist popularity value 130 and/or album popularity value 132 in different geographic regions, indicating that an artist is more or less popular in different regions. For example, an artist 116 can have a different artist popularity value 130 and/or album popularity value 132 in the United States than in Spain. Similarly, an artist 116 can have a different artist popularity value 130 and/or album popularity value 132 in New York than in Texas.

In one or more variations, the album popularity values 132 may be weighted according to recency of release of the one or more albums. For example, an artist 116 may have a list of released albums. Albums included in the list may be assigned a weight that is correlated with the release date of the album, such that albums that are newer (e.g., more recently released) have a greater weight than albums that are older (e.g., less recently released). The album popularity value 132 for the artist 116 may be based on a sum of weighted popularity values of one or more albums (e.g., all albums) on the list of albums of the artist.

In accordance with the described techniques, the popularity value estimation system 134 estimates a popularity value of a newly released media content item 118 (e.g., a media content item 118 that is within a cold start period) and stores a media content item popularity value 136 for the media content item in the storage 122. In one or more implementations, the popularity value estimation system 134 stores and updates media content item popularity values 136 for media content items 118 in the media content library 128. For example, the popularity value estimation system 134 outputs and stores an estimated popularity value for media content items 118 that are newly released (e.g., within the cold start period). For media content items 118 that are not newly released (e.g., the cold start period has elapsed), the popularity value estimation system 134 calculates a media content item popularity value 136 for the media content items 118 using a different technique or algorithm than is used the media content item popularity value for a newly released media content item 118. For instance, for media content items that are not newly released, the popularity value estimation system 134 may use a numerical quantity of searches for the media content items 118, a numerical quantity of accesses of the media content items 118, a duration the media content items 118 are accessed (e.g., listened to), a frequency the media content items 118 are accessed over an interval of time, and/or other engagement parameters related to users 104 interacting with the media content items 118.

In one or more implementations, the popularity value estimation system 134 may be configured to update media content item popularity values 136 for media content items 118 using personalized search weighting techniques, such as according to one or more preferences of a user 104. In this way, the media content item popularity values 136 may be personalized for the user 104. The computing device 108, the media content service provider system 102, or both can track user interaction with the media content items 118 and can report the user interaction to the popularity value estimation system 134. If a user 104 frequently interacts with a media content item 118, a genre of media content items 118, or the like, the popularity value estimation system 134 can increase the media content item popularity values 136 for the respective media content items 118 that apply to the preferences of the specific user conducting the search. Similarly, if a user does not frequently interact with a media content item 118 (e.g., does not search for a media content item 118 or skips a media content item 118), a genre of media content items 118, or the like frequently, the popularity value estimation system 134 can decrease the media content item popularity values 136 for the respective media content items 118 based on this lack of engagement. The popularity value estimation system 134 can thus use this interaction information to updated an estimated popularity value of a newly released media content item within the threshold time period (e.g., within the cold start period), such as by increasing an estimated popularity value of a media content item 118 that is associated with an artist that the user 104 interacts with positively (e.g., listens to more, does not skip, etc.) or by decreasing an estimated popularity value of a media content item 118 that is associated with an artist that the user 104 interacts with negatively (e.g., listens to less, does skip, etc.).

For example, the media content service provider system 102 can monitor engagement data of a user 104 as the user interacts with a streaming service application and can determine that a user 104 accesses (e.g., searches for or listens to) media content items 118 belonging to a first genre frequently but does not access media content items 118 belonging to a second genre as frequently. Additionally or alternatively, the media content service provider system 102 can determine that a user 104 accesses media content items 118 of a first artist 116 or a first album frequently but does not access media content items of a second artist 116 or a second album as frequently. The media content service provider system 102 can provide an indication of such engagement data to the popularity value estimation system 134. The popularity value estimation system 134 can then use the engagement data to promote, or increase, a media content item popularity value 136 of media content items 118 in the first genre, media content items 118 by the first artist 116, and/or media content items 118 in the first album, accordingly. Similarly, the popularity value estimation system 134 can use the engagement data to demote, or decrease, a media content item popularity value 136 of media content items 118 in the second genre, media content items 118 by the second artist 116, and/or media content items 118 in the second album, accordingly.

In one or more implementations, the popularity value estimation system 134 may personalize the media content item popularity value 136 for a user 104 independent of user input by using the engagement data collected by the computing device 108 (e.g., application data of the application 106). In some other examples, for instance, the computing device 108 prompts a user 104 to input one or more preferences related to artists 116 of media content items 118, albums including media content items 118, genres of media content items 118, and/or the like via a user interface (e.g., a graphical user interface (GUI)), which is described in further detail with respect to FIG. 8. The computing device 108 can report the user input to the media content service provider system 102, such as for use by the popularity value estimation system 134. The popularity value estimation system 134 can determine media content item popularity values 136 for the media content items 118 according to the preferences input. For example, if the user 104 indicates a preference for a genre, an artist, or an album, then the popularity value estimation system 134 can promote, or increase, a media content item popularity value 136 of media content items 118 in the genre, media content items 118 by the artist 116, and/or media content items 118 in the album, accordingly. Similarly, if the user 104 indicates a dislike of a genre, an artist, or an album, then the popularity value estimation system 134 can demote, or decrease, a media content item popularity value 136 of media content items 118 in the genre, media content items 118 by the artist 116, and/or media content items 118 in the album, accordingly.

In one or more scenarios, during operation, the media content service provider system 102 may receive a search request 138 (e.g., or a partial search request) for a media content item 118. In one or more such scenarios, the computing device 108 presents a user interface to a user 104 of the computing device 108, the user interface displaying one or more features of the application 106. By way of example and not limitation, the features of the application 106 include one or more input/output (I/O) features (e.g., interactive elements) with which the user can interact with the application 106 via the user interface. For instance, the user 104 can provide input via the user interface (e.g., via one or more interactive elements of the user interface) to select a media content item 118 for streaming, to search for a media content items 118, to control playback of and/or streaming of media content items 118 (e.g., play, stop, fast forward, rewind, skip, and reverse, among others), and so forth. For example, the media content service provider system 102 may receive a search request 138 from the computing device 108, such as via a user interface of the application 106 displayed by the computing device 108, examples of which are described in further detail with respect to FIGS. 4 through 7.

In one or more implementations, the search request 138 can include media content input 140 indicating a string value, a character value, or any other input value related to a media content item 118. For example, if the user 104 is searching for a music track, artist, or album, "abcd," the user can input the characters one at a time "a," "b," "c," and "d," or the user can input a string value "abcd," where the media content input includes one or more of the characters or the string value. The computing device 108 can transmit a search request 138 to the media content service provider system 102 for media content input 140 received by the computing device 108 (e.g., for a sequence of character values or for the string value).

In some examples, the media content service provider system 102 can obtain search results in response to the search request 138. For example, the media content service provider system 102 can access the media content library 128 to obtain one or more media content items 118 with metadata that includes matching values by comparing the metadata of the media content item 118 to the media content input 140. For example, if the media content input is "a," then the media content service provider system 102 can obtain a list of media content items 118 with metadata (e.g., music track name, music artist name, music album name, etc.) that begins with an "a." In some examples, the greater the numerical quantity of characters, the shorter the list of media content items 118. In one or more implementations, the media content service provider system 102 returns the list of media content items 118 or a portion of the list of media content items 118 to the computing device 108 for display to the user 104.

In some examples, a search request 138 can match a relatively large numerical quantity of media content items 118, such that if the numerical quantity of media content items were returned as search results, the results returned would be time consuming for a user 104 to review were the media content service provider system 102 not to sort and/or filter the list. Additionally, few (if any) computing devices have sufficient display areas to present such large numbers of search results to a user at one time. Thus, in one or more implementations, the media content service provider system 102 sorts, or ranks, the search results according to the media content item popularity value 136. Accordingly, media content service provider system 102 causes ranked search results 142 indicating media content items 118 to be provided to the computing device 108 in response to the search request 138. In some examples, media content items 118 with relatively high media content item popularity values 136 are ranked higher in the ranked search results 142 than media content items 118 with relatively low media content item popularity values 136. For example, a media content item 118 in the ranked search results 142 can have a media content item popularity value 136 higher than another media content item 118 in the ranked search results 142 and can be ranked above the other media content item 118 in the ranked search results 142. In one or more implementations, a numerical quantity of search results returned is fewer than a numerical quantity of media content items that match the search request. For instance, the numerical quantity of search results returned is a default numerical quantity, a user-specified numerical quantity (e.g., user preference), includes search results with a popularity value above a threshold popularity, and so forth. Ranking of search results as described herein provides efficient use of limited display areas of computing devices on which search results are presented to users.

In some examples, the computing device 108 displays the ranked search results 142 to the user via a user interface of the computing device 108, examples of which are described in further detail with respect to FIGS. 4 through 7. In one or more implementations, the user 104 can perform additional searches if the ranked search results 142 fail to include the media content item 118 the user is searching for or if the user 104 is searching for an additional media content item 118. For example, a first search request 138 can include the media content input 140, "a," in a search for a media content item 118 with a music track name, artist name, or album name "abcd," and a subsequent search request 138 can include the media content input 140, "ab," which can return different ranked search results 142 than the first search request 138. Further, the search request 138 with the media content input 140 "ab" may be determined by the media content platform to match fewer of the search results than the media content input "a". In one or more implementations, search requests 138 are provided in real-time as a user 104 inputs letters of the search request 138. Correspondingly, the media content service provider system 102 may determine matches and provide different ranked search results 142 in real-time as the search requests 138 are received character by character. Additionally or alternatively, search requests 138 are provided in real-time as a user 104 speaks words and a voice-based interface converts speech to text for input to the search request 138. Correspondingly, the media content service provider system 102 may determine matches and provide different ranked search results 142 in real time as the search requests 138 are received as voice-based input.

In the context of communication flow between the artist 116, the media distribution service system 120, the media content service provider system 102, and the user 104, consider the following discussion.

Figure 2:
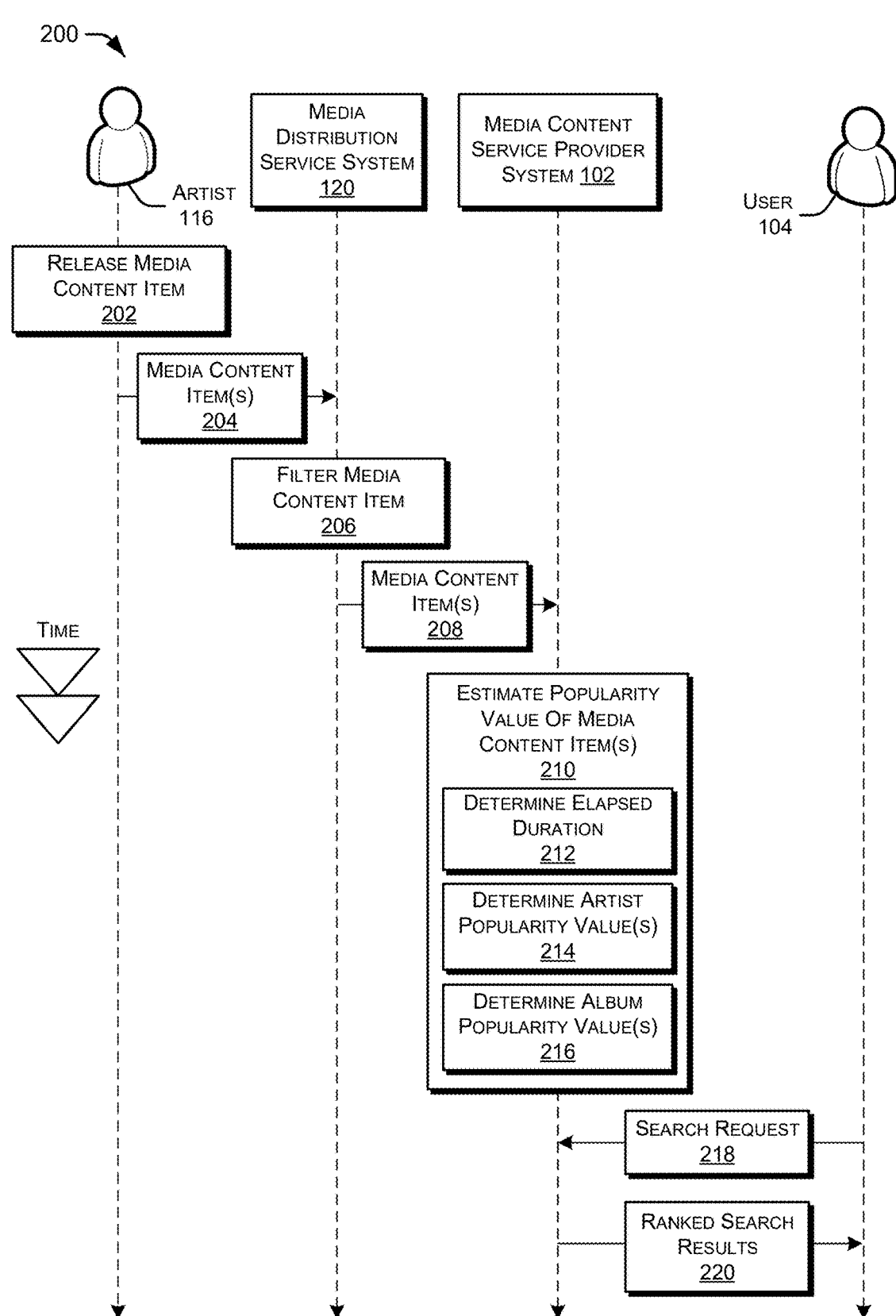
FIG. 2 depicts a non-limiting example of interactions of the media content service provider system with a media distribution service system that obtains media content from an artist device and with a computing device associated with a user account in accordance with one or more implementations.

FIG. 2 depicts a non-limiting example 200 of interactions of the media content service provider system with a media distribution service system that obtains media content from an artist device and with a computing device associated with a user account in accordance with one or more implementations.

The example 200 includes a variety of example electronic communications and interactions (e.g., including control signals) between the artist 116, the media distribution service system 120, the media content service provider system 102, and the user 104 over time. In this example 200, the electronic communications and interactions are positioned vertically based on time, such that electronic communications and interactions closer to a top of the example occur prior to electronic communications and interactions further from the top of the example. It follows also that electronic communications or interactions closer to a bottom of the example occur subsequent to electronic communications and interactions further from the bottom. In different implementations, such communications may occur in different orders than depicted in the example 200 without departing from the spirit or scope of the described techniques. Additionally, the electronic communications between the artist 116 and the media distribution service system 120 and between the user 104 and the media content service provider system 102 are conducted using computing devices of the artist 116 (e.g., the computing device 117) and the user 104 (e.g., the computing device 108), such as by using smart watches, mobile phones, laptops, and/or desktop computers of the artist 116 and the user 104.

In some examples, at 202, an artist 116 can release a media content item for access by one or more users 104. For example, the artist 116 can produce a media content item (a music track, a music album, a playlist, a music video, etc.) and can publish the media content item for streaming by one or more users 104. In one or more implementations, the artist 116 can use a media distribution service system 120 to coordinate providing one or more media content items to a media content service provider system 102. For example, at 204, the artist 116 (or an entity associated with the artist such as an agent or manager) can interact with an application on a computing device to send, or upload, a media content item released at 202 to the media distribution service system 120.

At 206, the media distribution service system 120 may analyze one or more parameters of the media content items to filter the media content items. For example, the media distribution service system 120 may compare a quality of the media content items to a quality threshold value. The media distribution service system 120 can compare a duration of the media content items to a threshold duration value to determine whether the media content items satisfy the threshold duration value (e.g., are too short or too long) to provide to the media content service provider system 102. The media distribution service system 120 may compare metadata to available data to verify accuracy of the media content items 118 (a track name, artist names, an album name, a release date, songwriter name(s), producer name(s), sound engineer name(s), etc.). For example, the media distribution service system 120 can access a database to obtain the data for verifying the accuracy of the media content and/or can otherwise determine the accuracy of the media content items. The media distribution service system 120 can also verify a licensing status for distribution of the media content items to verify that the media content service provider system 102 has acquired appropriate licenses for distribution of the media content item on behalf of the artist 116, as well as to what regions and/or based on one or more criteria specified in a license. Alternatively or additionally, the media distribution service system 120 can scan the content of the media content items to detect explicit or inappropriate content, duplication of content, originality of content, copyright infringement, and spam or fraud of the media content items 118, among other criteria.

At 208, if the media content items 118 satisfy the thresholds and the criteria for release, the media distribution service system 120 can send the media content items 118 to a media content service provider system 102, such as for further processing and/or distribution (e.g., broadcast) to user devices. In at least one implementation, the media content service provider system 102 can include the media distribution service system 120 (e.g., the media distribution service system 120 is a feature of the media content service provider system 102). That is, an artist 116 can interact with a platform or application to upload media content items that is a same platform or application that a user 104 interacts with to access the media content items. In at least one variation, the media content service provider system 102 is a separate entity from the media distribution service system 120. That is, an artist 116 can interact with a platform (e.g., an application) to upload media content items that is different from a platform that a user 104 interacts with to access the media content items.

At 210, the media content service provider system 102 estimates a popularity value of the media content items received from the media distribution service system 120. In some examples, the operation 210 occurs within a cold start period following receipt of the media content item(s) by the media content service provider system 102. The cold start period may be a defined duration from when a media content item is released at 202, from when the media content item is received by the media distribution service system 120, and/or from when the media content item is received by and/or distributed (e.g., published) to user devices by the media content service provider system 102. The cold start period may be defined in other ways without departing from the spirit or scope of the techniques described herein. For instance, the cold start period may begin based on various triggers, such as those mentioned just above and/or different ones. The cold start period may persist for different amounts of time, or durations, such as a fixed amount of time (e.g., 30 days from a release date) or a variable amount of time (e.g., once a number of views of the media content item in search results occurs). During this period, with conventional approaches, the media content items may have no popularity values, or the popularity values may not be accurate (lower than a threshold to be included in search results that can reasonably be displayed by a computing device of the user 104). The duration can be defined (e.g., by the media content service provider system 102) as a numerical quantity of days, weeks, or months from the release date of the media content items.

In accordance with the described techniques, the media content service provider system 102 may estimate the popularity value of newly released media content items (e.g., media content items within the cold start period) to effectively boost the newly released media content items in search results, as the newly released media content items often lack popularity to rank favorably enough among existing media content items to be included in search results. For example, without the estimation of the popularity values, newly released albums and tracks are typically ranked lower in search results by conventional approaches, making it difficult for users to be shown the latest music content for their discovery and/or enjoyment. In this way, the media content service provider system 102 prioritizes the discovery of new releases while also maintaining the search relevance of existing media content items to enhance the accessibility of media content items and facilitate an improved user experience for the user 104.

In some examples, a majority of newly released media content items exhibit relatively low artist popularity of a primary artist, which may also be referred to as a main artist. For example, if an artist 116 releases a lot of media content items, but none of them have a high measure of popularity (e.g., "white noise" tracks), then the majority of newly released media content items exhibit relatively low artist popularity for the artist. The media content service provider system 102 can establish criteria to demote or decrease a popularity value of media content items from less popular artists 116 to prevent or reduce the promotion of irrelevant items in search results. Additionally or alternatively, demoting or decreasing a popularity value for media content items from less popular artists prevents or reduces overloading a search cluster with excessive updates. For example, if there are a total of 1,383,100 newly released media content items, 34,015 can be assigned an initial estimated popularity value, while the remaining media content items are not assigned an initial estimated popularity value. Thus, approximately 2.5 percent of the total data is assigned popularity values, suggesting that leveraging popularity approximation provides for the media content service provider system 102 to identify promising candidates to present to users 104 when they are relevant. Further, promoting newly released media content items can enhance a search experience for a user 104 by improving discoverability and accessibility of the latest (e.g., newest) media content items. Promoting newly released media content items in this way can also reduce an amount of input provided to user devices to search for the newly released media content items, reducing an amount of input processing performed by user devices and communication with the media content platform to perform additional searches when a desired new media content item is not initially returned in search results.

In some examples, a considerable percentage of newly released media content items are attributed to artists 116 producing music in one or more genres, such as a white noise genre, among other genres that include media content items streamed for extended durations (e.g., during sleep).

For example, popularities of artists 116 may reach as high as around 0.5 percent of total media content items, but many of the media content items released for the artist 116 may not be individually popular. Thus, an initial popularity value for newly released media content items can be based on a combination of a popularity of an artist 116 of the media content item and other factors, including a popularity of previous album releases (e.g., not solely based on the popularity of an artist 116).

In one or more implementations, the media content service provider system 102 is configured to determine a duration of the cold start period. For example, the media content service provider system 102 can determine the duration of the cold start period by setting a threshold popularity value and analyzing a duration for one or more newly released media content items that are known to be popular to climb to the threshold popularity value from an initial popularity value of zero (e.g., 0 to 0.75). Further, the media content service provider system 102 may determine a minimum duration before popularity values climb to a threshold popularity, an average duration before popularity values to climb to the threshold, or the like. Based on the analysis, the media content service provider system 102 can then set the cold start period as the minimum duration and/or the average duration. For example, if it takes a minimum of 24 days for a set of newly released media content items that are determined to be popular to obtain the threshold popularity, then the media content service provider system 102 can set the cold start period to be 24 days or 30 days to include a buffer. The media content service provider system 102 can estimate popularity values for the types of media content items (e.g., a music track, for a music album, or both). The cold start period can be the same for different types of media content items (e.g., a music track and a music album) and/or can be different for different types of media content items. In some other examples, the duration of the cold start period can be predefined or determined in any other manner.

Figure 3:
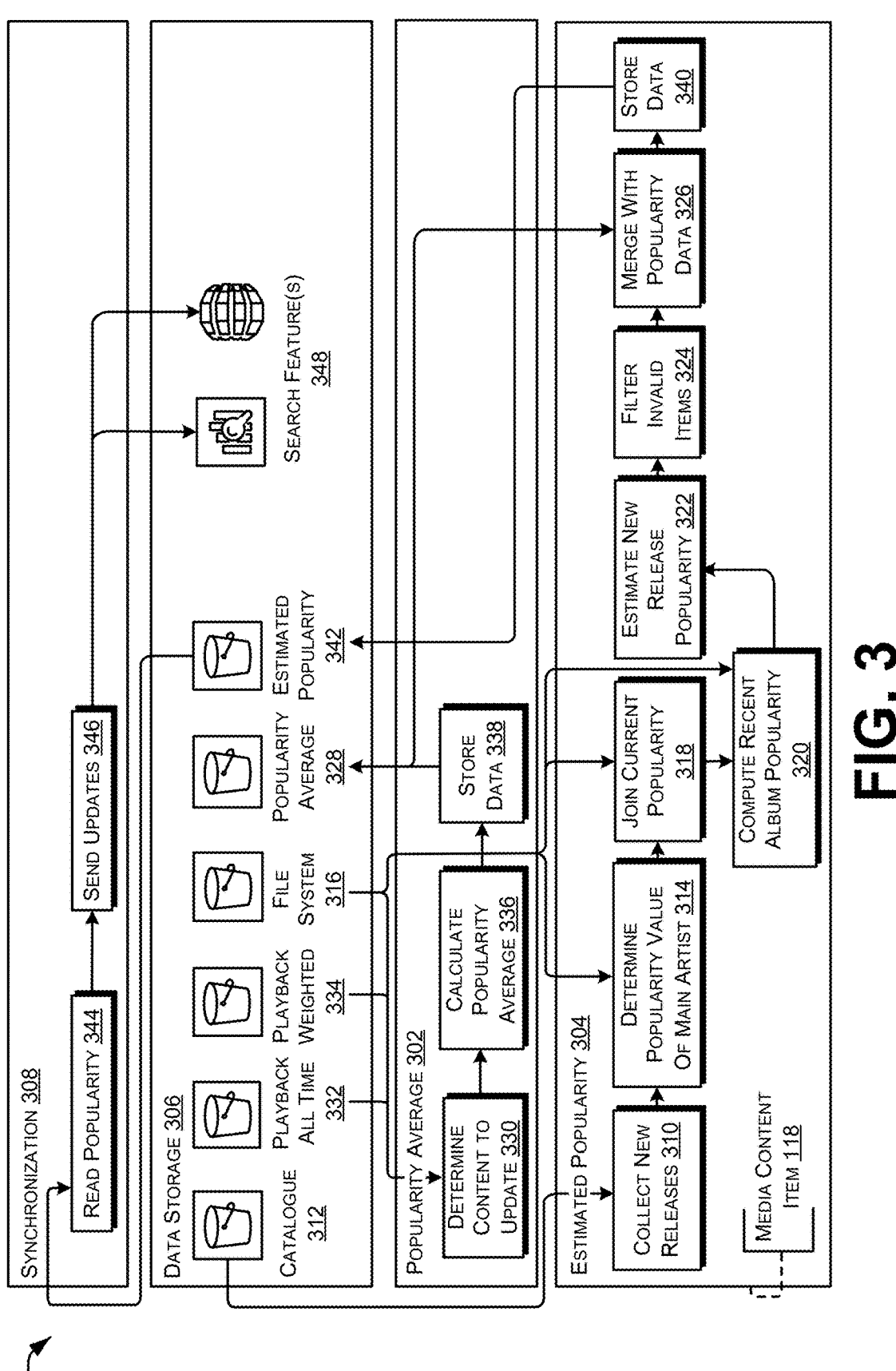
FIG. 3 depicts a non-limiting example implementation of search ranking media content items in accordance with one or more implementations.

In some examples, the media content service provider system 102 can periodically estimate popularity values for media content items and can update a stored value of the popularity values for the media content items, which is described in further detail with respect to FIG. 3. For example, at 212, the media content service provider system 102 may determine a duration that has elapsed between the release of the media content item and/or distributing the media content item and a current time when estimating the popularity value of the media content items. At 214 and 216, the media content service provider system 102 can access a database to determine or obtain an artist popularity value for an artist 116 of a media content item and/or to determine or obtain album popularity values for albums previously released by the artist 116, respectively. In some examples, the media content service provider system 102 estimates the popularity value of a media content item in the cold start period using the artist popularity values, the album popularity values, and/or a decay factor that is based on (e.g., proportional to) the elapsed duration, which is described in further detail with respect to FIG. 3.

In one or more implementations, a popularity value of a media content item can vary depending on a geographical region of a user 104. For example, a user 104 in a city, state, country, or continent can listen to different artists than a different user 104 in a different city, state, country, or continent. Table 1 presents a sample analysis of tracks with approximated worldwide popularity values for newly released media content items.

TABLE 1

| Bucketed Worldwide Popularity | Count | Percentage, % |
|---|---|---|
| 6 | 21 | 0.004 |
| 5 | 141 | 0.030 |
| 4 | 5016 | 1.052 |
| 3 | 329287 | 6.142 |
| 2 | 82382 | 17.278 |
| 1 | 167498 | 35.129 |
| 0 | 192458 | 40.364 |

Table 1 displays how an approximated, or estimated, worldwide popularity value for a media content item may be categorized into 10 buckets, such as bucket 0: [0, 0.1), bucket 1: [0.1, 0.2), and so forth. The percentages are calculated by counting values within the buckets. In at least one implementation, a strength of promotion of a media content item (e.g., defined by how high the estimated worldwide popularity value is) depends on a popularity value of a main artist 116 of a media content item, recent album popularity for albums previously released by the main artist 116, and a time decay weight depending on an age of the media content item. When such factors are higher, the popularity value estimation system 134 determines a more favorable popularity for a media content item, which results in the media content item being boosted more among search results and thus appearing higher (e.g., better ranked) on a ranked list of search results.

In operation, the user 104 interacts with the media content service provider system 102 via a user interface to access, or stream, media content. For example, the user 104 opens the application 106 via a user interface of the computing device 108 and interacts with one or more interactive elements of the user interface to access the media content items. The interactive elements can include selectable elements (e.g., buttons or menus that can be selected), scrollable elements, or any other interactive user interface elements. The user 104 can provide input to the media content service provider system 102 via the user interface to trigger a search feature of the media content service provider system 102. For example, the user 104 can input a string value and/or a character value to the user interface.

At 218, a computing device of the user 104 sends a search request (e.g., the search request 138) to the media content service provider system 102 including the input (e.g., the media content input 140) from the user 104. The media content service provider system 102 can use the input to search a database, including a media content item library, for one or more media content items that satisfy a search criterion (e.g., match, or are similar, to the input). The media content service provider system 102 obtains search results including media content items related to the input. The media content service provider system 102 further ranks the search results according to popularity values of the media content items. If the media content item qualifies for being in the cold start period, the popularity value for the media content item can be estimated using the determined artist popularity values, the determined album popularity values, and the decay factor based on the elapsed duration. If the media content item is not in the cold start period, however, the popularity value for the media content item can be determined using a different popularity metric, such as a number of accesses (e.g., streams of or searches for) of the media content items by users in the geographic region, frequency (e.g., numerical quantity) of accesses for the media content items by users 104 in the geographic region, a frequency of streaming of the media content items, and/or a duration of streaming of the media content items, to name just a few. In one or more implementations, the search results include both media content items in the cold start period and media content items outside of the cold start period, such that the media content items in the cold start period are boosted in the rankings.

At 220, the media content service provider system 102 sends the ranked search results (e.g., the ranked search results 142) to the computing device 108 associated with the user 104. The computing device 108 of the user 104 can then display one or more of the ranked search results (e.g., in order) to the user 104 via a user interface (e.g., of the application 106), which is described in further detail with respect to FIGS. 4 through 7.

FIG. 3 depicts a non-limiting example 300 implementation of search ranking media content items in accordance with one or more implementations.

A media content service provider system, such as the media content service provider system 102 as described with reference to FIGS. 1 and 2, can estimate popularity values for media content items 118. For example, the media content service provider system can calculate a popularity average 302 for the media content items 118 in a media content library of the media content service provider system. In some examples, media content items 118 in the media content library are within a cold start period. Thus, the media content service provider system can determine an estimated popularity 304 that accounts for the media content item 118 being within the cold start period. The media content service provider system can store the popularity average 302 and the estimated popularity 304 in data storage 306. In one or more implementations, the media content service provider system periodically performs a synchronization procedure (e.g., synchronization 308) to update the popularity values.

In some examples, the media content service provider system uses a popularity of a main artist of a media content item, a weighted average of a popularity of recent albums released by the main artist, and a decay factor to calculate an estimated popularity value for the media content items 118 in a cold start period. Other examples of metrics that may be used to determine an estimated popularity value may include popularity of contributing artists (other than the main artist) to the media content item, popularity of other songs written by songwriter(s) of the media content item, whether the media content item incorporates one or more trends of popular media content items (e.g., instruments, vocals, beat, tempo, etc.), and the like. The decay factor gradually reduces the contribution of the estimated popularity values to a popularity value of a media content item until either the estimated popularity value of the media content item 118 converges with the popularity average value of the media content item 118, or the elapsed duration of the media content item 118 reaches the end of a cold start period with an average popularity value below a threshold (e.g., zero or close to zero). The metrics used to determine the estimated popularity value, such as the popularity value of the main artist and the popularity of the recent albums released by the main artist, can be worldwide popularity values or can be specific to a geographical region of a user of the media content service provider system.

In some examples, the cold start period is defined in days (e.g., 30 days) from release of a media content item 118 by an artist or from a day that the media content item 118 is received at the media content service provider system. The media content service provider system can utilize an offset to determine when to begin applying the decay factor to the estimated popularity value for the media content items 118. For example, the offset is a duration measured in days (e.g., 3 days) after a media content item 118 is released by the artist or received by the media content service provider system. During the offset, newly released media content items 118 can experience peak exposure in search results due to waiting to apply the decay factor until after the offset. That is, in some examples, a popularity value of a media content item 118 may be relatively high during the offset because the estimated popularity value of a media content item 118 is not decreased by a decay factor during the offset. Once the decay factor is applied (e.g., after the offset), then the estimated popularity value of the media content item 118 may decrease until convergence or until within a threshold tolerance value of zero (e.g., zero or near zero). If the decay factor is applied before the offset, then the estimated popularity value of the media content items 118 may fall below an actual popularity value of the media content items 118.

In some examples, at 310, the media content service provider system collects newly released media content items 118 (e.g., new releases) from the data storage 306. The media content service provider system can store the newly released media content items 118 in a catalogue 312 at the data storage 306. The catalogue 312 can represent a media content library of the media content service provider system. The media content service provider system approximates the popularity values of media content items 118 with a release date within the cold start period, which enhances discoverability of the newly released media content items 118 in search results.

At 314, the media content service provider system can extract a main artist from metadata of the media content item 118 collected at 310. The media content service provider system can determine a popularity value of the extracted artist (e.g., a worldwide and/or geographical region popularity value of the artist). For example, the media content service provider system accesses a file system 316 of the data storage 306 to obtain the artist popularity value and/or information for determining the artist popularity value. The file system 316 can maintain current popularity values for artists of various media content items 118 in the catalogue 312. In some cases, a media content item 118 is produced by multiple artists. The media content service provider system can determine which artist of the multiple artists is the most popular by comparing the artist popularity values obtained from the file system 316. The media content service provider system can consider an artist with a greatest popularity value as a main artist for the media content item 118. Alternatively or additionally, the media content service provider system may combine popularity values for multiple of the contributing artists (and/or songwriters, producers, sound engineers, etc.), such as weighting individual contributors based on respective popularities, to determine an overall popularity value for the contributors to the media content item.

At 318, the media content service provider system can determine an original, or current, popularity value of a media content item 118 with a popularity value of the main artist. The media content service provider system can access the file system 316 to obtain information for determining the original popularity value of the media content item 118. In some examples, the original popularity values of newly released media content items 118 (e.g., popularity values within 1, 8, 12, 24, etc. hours of receipt by the media content service provider system) are unavailable or extremely low. In some cases, the approximated or estimated popularity value becomes lower than the actual popularity value, which may be referred to as convergence. When the actual popularity value of newly released media content items 118 converges with the estimated popularity value for the newly released media content items 118, the media content service provider system determines that estimating the popularity value is no longer valuable for ranking search results due to unnecessarily demoting the media content items 118. Thus, the media content service provider system can exclude the estimated popularity value from a dataset representative of popularity values for media content items 118 in the media content library of the media content service provider system.

At 320, the media content service provider system can compute an album popularity for albums recently released by the main artist of a media content item 118. The media content service provider system can access the file system 316 to obtain information related to a popularity value for albums from the main artist released within a threshold duration from the release date of a newly released media content item 118 and/or within a threshold duration from the when the media content service provider system receives the newly released media content item 118. The albums that are released within the threshold duration can be considered recent albums of the main artist. The media content service provider system can calculate a weighted average of popularity values for the recent albums. The weights can be assigned to the albums according to a recency of release, such that popularity values of albums released more recently have a greater weight than popularity values of albums released less recently.

At 322, the media content service provider system can estimate a popularity value for newly released media content items 118. In some examples, the media content service provider system utilizes three factors to estimate the popularity of the newly released media content items, including an artist popularity value for the main artist, a weighted average of the album popularity values for albums recently released by the main artist, and an age of the newly released media content items 118. As the age of the newly released media content items 118 progresses towards the end of the cold start period, the estimated popularity values for the newly released media content items 118 are decreased until the estimated popularity values converge with a current popularity value of the media content items 118 or until the estimated popularity values approach or become zero.

At 324, the media content service provider system can filter out media content item 118 from a dataset of newly released media content items 118 and respective estimated popularity values. The filtering can include removing unqualified media content items 118 from the dataset according to qualification criteria. The qualification criteria include media content items 118 with a popularity value that has already converged, media content items 118 with a current popularity value greater than the estimated popularity value, media content items 118 from blacklisted sources, items released from artists with a popularity value lower than a threshold value (e.g., 0.2 popularity worldwide or for the geographical region), or any combination thereof.

At 326, the media content service provider system can merge the estimated popularity value information with other data in a latest (e.g., current) popularity average dataset 328. By merging the estimated popularity value information with the data in the popularity average dataset 328, the media content service provider system creates a unified dataset.

The popularity average dataset 328 can be periodically updated based on a popularity average 302 of media content items 118 in the media content library. For example, if an update is triggered (e.g., according to a periodicity or because a media content item 118 is added to the media content library, among other triggers), at 330, the media content service provider system determines content to update by accessing the file system 316, a playback all time dataset 332, a playback weighted dataset 334, or any combination thereof. For example, the content to update includes content that has not been updated within a threshold duration (e.g., 24 hours, 12 hours, 6 hours, etc.), content that is added to the media content library, content that has an associated playback value that has changed (a change in numerical quantity of playbacks, a change in duration of playback, etc.), and the like.

At 336, the media content service provider system can calculate a current popularity average for the media content items in the media content library (e.g., the media content items 118 in the media content library or a portion of media content items 118 in the media content library according to the determination at 330). The media content service provider system can utilize information obtained from the file system 316, the playback all time dataset 332, and the playback weighted dataset 334 to calculate the current popularity average for individual media content items 118. For example, the media content service provider system utilizes a frequency of accesses for the media content items 118 obtained from the playback all time dataset 332 or the playback weighted dataset 334, a frequency of streaming of the media content items 118 obtained from the playback all time dataset 332 or the playback weighted dataset 334, a duration of streaming of the media content items 118 obtained from the playback all time dataset 332 or the playback weighted dataset 334, an artist popularity for an artist of the media content items 118 determined from information obtained from the file system 316, an album popularity related to an album of the media content item 118 determined from information obtained from the file system 316, or other values related to the popularity of a media content item 118.

At 338, the media content service provider system can store data including the calculated popularity value for the media content items 118. The media content service provider system can store the data in a popularity average dataset 328.

At 340, the media content service provider system can store data including the estimated popularity 304 for the media content items 118 within the cold start period. The media content service provider system can store the estimated popularity values in an estimated popularity dataset 342 at the data storage 306. In some examples, the media content service provider system may implement artificial intelligence to determine the estimated popularity values. The media content service provider system may obtain a training dataset (e.g., from the estimated popularity dataset 342). In some examples, the training dataset can include labeled data for supervised machine learning techniques and/or data that is not labeled for unsupervised machine learning techniques. The media content service provider system may train one or more machine learning models to generate an estimated popularity value for newly released media content items 118 using the training dataset. The media content service provider system may input a prompt to the trained machine learning models, such as a track title and/or other identifier of a newly released media content item 118, and the trained machine learning models may generate an estimated popularity value for the media content item 118.

The media content service provider system can use the stored data during synchronization 308. For example, at 344 the media content service provider system reads a popularity value from the estimated popularity dataset 342. At 346, the media content service provider system can send updates to one or more search features 348 of the media content service provider system. The search features 348 can request the updated popularity information for populating a ranked list of search results to send to a computing device of a user, as described with reference to FIGS. 1 and 2.

In some examples, to trigger the collection of new releases, at 310, the media content service provider system receives a request of an artifact type (e.g., a media content item type) from a user. The artifact type can be a music track, a music album, or any other type of audio or video media content item. The media content service provider system can generate foundational data for the subsequent processes. To collect new music tracks, the media content service provider system can use a track index dataset from the catalogue 312 that includes available music tracks and that is updated periodically (e.g., daily). To identify newly released music tracks that are within the cold start period, the media content service provider system can utilize release date information and availability information of a music track (e.g., an albumReleaseDate parameter and/or a firstAvailableDate parameter for the media content item 118). For a music track to be considered a newly released music track, both the release data information and the availability information are within the cold start period. Additionally or alternatively, the media content service provider system can determine a music track is a newly released music track if the music track is available and not generated from a video.

Similarly, when collecting music albums, the media content service provider system can utilize an album index dataset from the catalogue 312. The media content service provider system identifies newly released albums if release date information and availability information satisfy a threshold value (e.g., are within a cold start period). In some examples, newly released albums can be eligible for collection if they are available and not generated from a video (e.g., include music tracks and not videos). The media content service provider system can utilize a similar procedure to collect types of media content items 118 other than music tracks and music albums.

In some cases, to extract and determine a popularity value of a main artist for the collected newly released media content items 118 at 314, the media content service provider system uses a file system 316 (e.g., a Snitch), which is a database holding recent popularity information about different media content items 118 including artist popularity. If the artist popularity value in the file system 316 is missing, then the media content service provider system uses a default value (e.g., zero). If the media content item 118 has multiple artists, the media content service provider system may select a most popular artist as the main artist for the media content item 118. In some examples, if the artist popularity value in the file system 316 is missing, then the media content service provider system can search for an artist popularity value of a secondary artist of the media content item 118 (e.g., if the media content item 118 has more than one artist), a producer of the media content item, a writer of the media content item, or any other artist related to the media content items 118.

To determine the original popularity value or a current popularity value for a newly released media content item 118, at 318, the media content service provider system can access the recent popularity information from the file system 316. If the current popularity value in the file system 316 is missing, then the media content service provider system uses a default value (e.g., zero). For newly released media content items 118, the current popularity value is expected to start from a relatively low value. As time goes by, the current popularity value may gradually increase and, at some point, even surpass the initial approximated or estimated popularity value for the media content items 118, which is referred to as a convergence. A convergence of an estimated popularity value with a current popularity value of a media content item 118 indicates that the media content service provider system can stop estimating or approximating a popularity value for the media content item 118. Thus, the media content service provider system can utilize the current popularity of a media content item 118 to detect convergence, which defines the end of a cold start period for that media content item 118.

In some examples, recent album releases by artists may serve as an indicator of a potential popularity of future releases of media content items 118. When artists consistently release albums that receive a positive reception and relatively high levels of popularity, the media content service provider system can determine that the artist has a relatively strong fan base of users and ongoing interest in the work of the artist. The fan base of users is more likely to be receptive to and engaged with upcoming releases of the artist. Therefore, monitoring album releases of artists can be a valuable signal in predicting the popularity and success of future releases of media content items 118. By considering both an artist popularity and a popularity of recent album releases, the media content service provider system can enhance the effectiveness of the popularity approximation process for new releases.

The media content service provider system can calculate a weighted average of the popularity value of recent albums for an artist according to Equation 1:

$$W = \frac{\sum_{i=0}^{n} (x_i * w_i)}{\sum_{i=0}^{n} w_i}, \tag{1}$$

where $x_i$ is the popularity value of a recent album and $w_i$ is y−(new media content item release date−previous album release date$_i$)+1, with y being a defined time window or duration.

For example, the media content service provider system sets the defined time window to 3 months to evaluate albums previously released before a new music album and/or music track becomes available. Thus, the media content service provider system assigns greater significance to more recent releases than to older releases, in comparison to newly released content. Consequently, the weighted average of recent album releases is calculated, with more emphasis placed on the most recent albums. According to Equation 1, the weights are specifically calculated by considering the time differences between a release data of a media content item 118 and the release dates of a recent album by the main artist of the media content item 118. To derive these weights, the time difference is subtracted from a maximum value defining a recent album, which may be 1 month, 3 months, 6 months, etc.

To approximate or estimate popularity of a newly released media content item 118, at 322, the media content service provider system utilizes the artist popularity, the weighted average of the album popularity for recent albums, and a time decay function. The media content service provider system implements the time decay function to gradually decrease the promotion of newly released media content items 118 over time. The media content service provider system can designate an offset, which refers to a numerical quantity of days after a release date during which the media content service provider system does not apply the time decay function to an approximated or estimated popularity value. After this period, a time decay is applied to the approximated popularity values to decrease the promotion of the newly released media content items 118 gradually. The time decay function can be represented by Equation 2:

$$\text{Decay}(doc_{age}) = \tag{2}$$

$$\begin{cases} 1, & 0 \leq doc_{age} \leq \text{Offset} \\ \dfrac{s - \max(0, doc_{age} - \text{Offset})}{s}, & \text{Offset} < doc_{age} \leq \text{Cold Start Period} \end{cases},$$

where s signifies the distance from the offset at which the computed score will equal 0. In other words, s=Cold Start Period−Offset. The parameter $doc_{age}$ is defined as the age of the media content item 118 in days, with Offset denoting a numerical quantity of days after a release day of the media content item 118 during which the media content service provider system does not decrease the popularity value.

Over time, these approximated popularity values may either decrease toward zero or reach a point of convergence, which indicates the media content service provider system can terminate approximations of the popularity value (e.g., as the approximation is less than the current popularity value). With the artist popularity value, the album popularity value, and the decay function, the media content service provider system can utilize Equation 3 to calculate the approximated average popularity value for new releases in the dataset across multiple countries.

$$\{P(c)|\forall c \in \text{Country Codes}, P(c) = \tag{3}$$

$$\text{Decay}(doc_{age}) * ((\text{Artist weight}) * \text{Main artist popularity average } (c)) +$$

$$(1 - \text{Artist weight}) * \text{Recent album weighted average popularity}\}$$

The parameter Artist weight serves as an indicator that the media content service provider system applies to the artist popularity value (e.g., can have a value of 0.6). Increasing the value of the artist weight parameter calculation results in an increase in significance of the artist popularity value, while reducing the significance of the recent album weighted average popularity value. If the current popularity value of the content is greater than the approximation, the media content service provider system employs the current popularity values to avoid unnecessary decrease in the popularity value for a media content item 118.

To filter invalid items, at 324, the media content service provider system uses a set of criteria. The criteria can include a convergence of the estimated popularity value for a media content item 118 with a current or original popularity value of the media content item 118. If the popularity values for a media content item 118 have converged, the media content service provider system stops determining the estimated popularity 304 for the media content item 118. Additionally or alternatively, the criteria can include a validation of an artist of the media content item 118. For example, many media content items 118 are released under a generic label (e.g., "various artists), but may not actually be new media content items 118. Additionally or alternatively, the media content service provider system can compare an artist popularity value of a media content item 118 to a threshold value (e.g., 0.2) to determine if the artist popularity value is sufficient. If the artist popularity value is less than the threshold value, then the media content service provider system stops estimating the popularity value for the media content item 118, as the media content item 118 is likely unpopular and calculating an estimated popularity value can result in unnecessary use of computational resources.

In some examples, to merge the estimated popularity values for one or more newly released media content items 118 with a dataset including current popularity values for media content items 118 in a media content library of the media content service provider system, at 326, the media content service provider system creates a unique dataset that includes valid data from both the popularity average 302 and the estimated popularity 304 procedures. The popularity average dataset 328 stores information related to media content items 118 for synchronization 308 for search features 348. The media content service provider system can remove values for newly released media content items 118 and can replace the values with the estimated popularity values to create the unique dataset. The search features 348 can access the unique dataset during synchronization 308.

After processing and preparing the data, the media content service provider system can store the data, at 340. Storing the data facilitates the synchronization 308. In some cases, the path to store data for types of media content items 118 is partitioned by date.

In some examples, one or more search features 348 or other components of the media content service provider system perform the synchronization 308, referred to as synchronization components. The synchronization process can occur periodically (e.g., daily at a specified time). In some cases, synchronization components read from the estimated popularity dataset 342 when a type of the media content item 118 is either a music track or a music album. By incorporating the estimated popularity dataset 342, which includes data from both the popularity average and the newly released media content items 118, the synchronization components can synchronize both sets of data in a single operation. This ensures that both systems receive the updated popularity and approximated popularity for newly released media content item 118 seamlessly.

In some examples, the media content service provider system evaluates the impact of utilizing the estimated popularity dataset 342 for ranking search results according to Equation 4:

$$\text{Impression Rate} = \tag{4}$$
$$\frac{\text{Total Number of Sessions With}}{\text{at least One New Release in First 3 Days}}{\text{Total Number of Sessions}}$$

The media content service provider system can also determine an absolute top impression rate as a percentage of newly released media content items 118 that are shown at the top 3 search results according to Equation 5:

$$\text{Absolute Impression Rate} = \tag{5}$$
$$\frac{\text{Total Number of Sessions With at least One}}{\frac{\text{New Release in First 3 Days at Top 3 Positions}}{\text{Total Number of Sessions}}} * 100.$$

The impression rate and the absolute impression rate indicates the use of the estimated popularity value has increased discoverability of newly released media content items 118, providing for artists to gain additional visibility and exposure in the top positions and enhancing the overall user experience.

Figure 4:
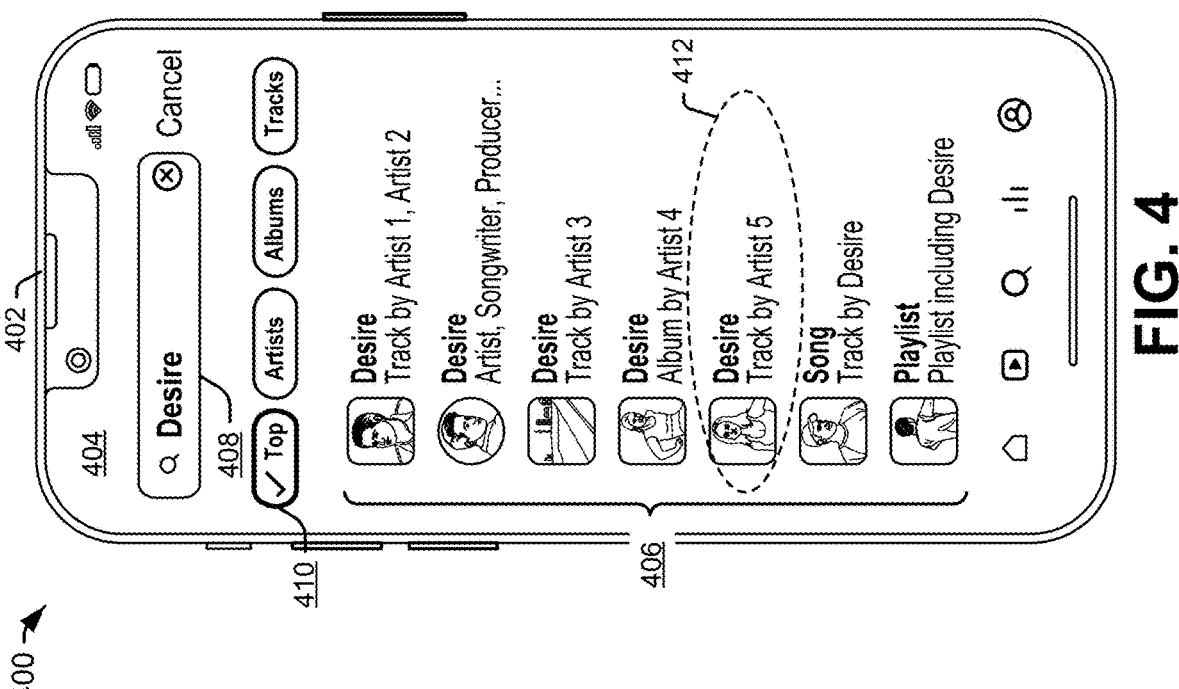

FIG. 4 depicts a non-limiting example 400 of a user interface for search ranking media content items in accordance with one or more implementations.

The illustrated example 400 depicts a computing device 402 displaying a user interface 404 for display to a user (e.g., a user 104 as described with reference to FIGS. 1 and 2). In this example 400, the computing device 402 receives a ranked list 406 including search results for media content.

A user can interact with a search feature 408 of the user interface 404 to input a string value and/or a character value. For example, the user inputs a string value "Desire" into the search feature 408 when searching for a media content item (e.g., a music track with a name "Desire" by an Artist 5). The computing device 402 can send the input to a media content service provider system. In some examples, the computing device 402 sends input to the media content service provider system after the user enters a character value of the string value. The media content service provider system can determine a ranked list 406 for the input, such that the string value "Desire" could result in six different ranked lists 406 (e.g., a ranked list for "D," a ranked list for "De," a ranked list for "Des," a ranked list for "Desi," a ranked list for "Desir," and a ranked list for "Desire"). The user interface 404 can include additional interactive elements, such as one or more selectable features 410 (e.g., selectable buttons) to indicate to the media content service provider system a preference for ranking type of media content item in the ranked list 406. For example, the user selects "Top," as shown in FIG. 4, to indicate to the media content service provider system to sort the media content items independent of type. If the user selected "Artists," "Albums," and/or "Tracks," the media content service provider system sorts media content items with a type of artist, album, and/or track higher up on the ranked list 406 depending on the selection.

In some examples, the ranked list 406 includes any numerical quantity of media content items. For example, the ranked list 406 includes a track with a name "Desire" by Artist 1 and Artist 2, an artist with a name "Desire," another track with a name "Desire" by an Artist 3, an album with a name "Desire" by an Artist 4, a track with a name "Desire" by an Artist 5, a track with a name "Song" by an artist named "Desire," and a media content item with a name "playlist" that is a media content item type of playlist that includes a track or an artist with a name "Desire." The ranked list 406 is ranked according to the popularity value stored in a popularity average dataset, such as a popularity average dataset 328, as described with reference to FIG. 3.

In some examples, the media content service provider system uses current popularity values of media content items to determine where to place a media content item in the ranked list 406. However, using current popularity values of media content items results in a newly released media content item 412 being ranked relatively low on the ranked list 406. For example, the newly released media content item 412 is relatively popular compared with the other media content items in the ranked list 406 (e.g., one or more of the track by Artist 1 and Artist 2, the artist named "Desire," the track by Artist 3, or the album by Artist 4), however because the newly released media content item 412 is within a cold start period, the media content service provider system could rank the newly released media content item 412 relatively low on the ranked list 406. To prevent additional searches for the newly released media content item 412 and to improve user experience and improve efficiency of use of computational resources, the media content service provider system can use an estimated popularity value for the newly released media content item 412 to initialize the popularity value of the newly released media content item 412 during the cold start period, which is described in further detail with respect to FIG. 5.

Figure 5:
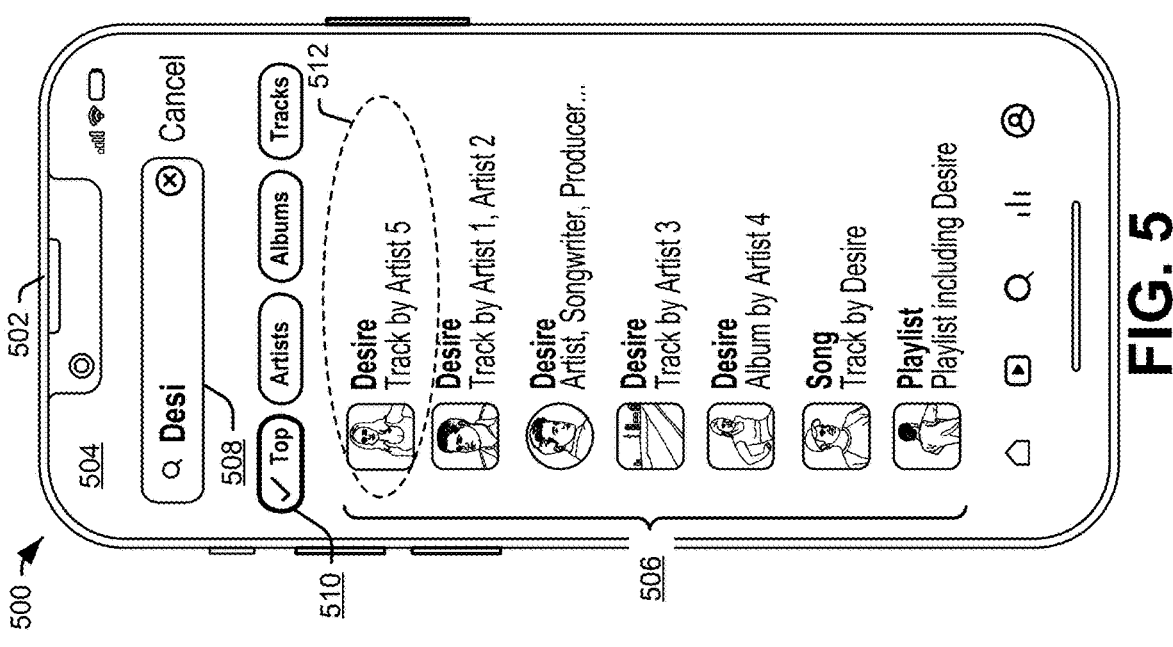
FIGS. 4-9 depict non-limiting examples of user interfaces for search ranking media content items in accordance with one or more implementations.

FIG. 5 depicts a non-limiting example 500 of a user interface for search ranking media content items in accordance with one or more implementations.

The illustrated example 500 depicts a computing device 502 displaying a user interface 504 for access by a user (e.g., a user 104 as described with reference to FIGS. 1 and 2). In this example 500, the computing device 502 receives a ranked list 506 including search results for media content.

A user can interact with a search feature 508 of the user interface 504 to input a string value and/or a character value. For example, the user inputs a string value "Desi" into the search feature 508 when searching for a media content item (e.g., a music track with a name "Desire" by an Artist 5). The computing device 502 can send the input to a media content service provider system. In some examples, the computing device 502 can send input to the media content service provider system after the user enters character values of the string value. The media content service provider system can determine a ranked list 506 for input, such that the string value "Desi" could result in four different ranked lists 506 (e.g., a ranked list for "D," a ranked list for "De," a ranked list for "Des," and a ranked list for "Desi"). The user interface 504 can include additional interactive elements, such as one or more selectable features 510 (e.g., selectable buttons) to indicate to the media content service provider system a preference for ranking type of media content item in the ranked list 506. For example, the user can select "Top," as shown in FIG. 5, to indicate to the media content service provider system to sort the media content items independent of type. If the user selected "Artists," "Albums," and/or "Tracks," the media content service provider system sorts media content items with a type of artist, album, and/or track higher up on the ranked list 506 depending on the selection.

In some examples, the ranked list 506 includes any numerical quantity of media content items. For example, the ranked list 506 includes a track with a name "Desire" by Artist 5, a track with a name "Desire" by Artist 1 and Artist 2, an artist with a name "Desire," another track with a name "Desire" by an Artist 3, an album with a name "Desire" by an Artist 4, a track with a name "Song" by an artist named "Desire," and a media content item with a name "playlist" that is a media content item type of playlist that includes a track or an artist with a name "Desire." The ranked list 506 is ranked according to the popularity value stored in a popularity average dataset, such as a popularity average dataset 328, as described with reference to FIG. 3.

In some examples, the media content service provider system uses an estimated popularity value for newly released media content items (e.g., media content items within a cold start period). The media content service provider system can use current popularity values for media content items that are not within the cold start period. The estimated popularity values and the current popularity values correspond to a location of the media content item in the ranked list 506. Thus, a newly released media content item 512 can be ranked relatively high on the ranked list 506 if the artist and one or more previously released albums of the artist are relatively popular. For example, the media content service provider system can determine the newly released media content item 512 is relatively popular compared with the other media content items in the ranked list 506 (e.g., one or more of the track by Artist 1 and Artist 2, the artist named "Desire," the track by Artist 3, or the album by Artist 4) using the estimated popularity value for the newly released media content item 512. Further, the user can provide fewer inputs to the search feature 508 to produce search results including the newly released media content item 512 when compared with FIG. 4. The user providing fewer inputs reduces computational resources used to populate the search results after character values are input to the search feature 508, as well as improves user experience by decreasing an amount of time it takes for the user to locate a popular newly released media content item 512. By decreasing the amount of manual input, a user device of the user searching for the media content processes fewer inputs thereby decreasing the use of processing resources (e.g., processor cores, memory, etc.) and the burden on such resources, which can improve battery life of the user device and/or enable the user device to perform other tasks.

Figure 6:
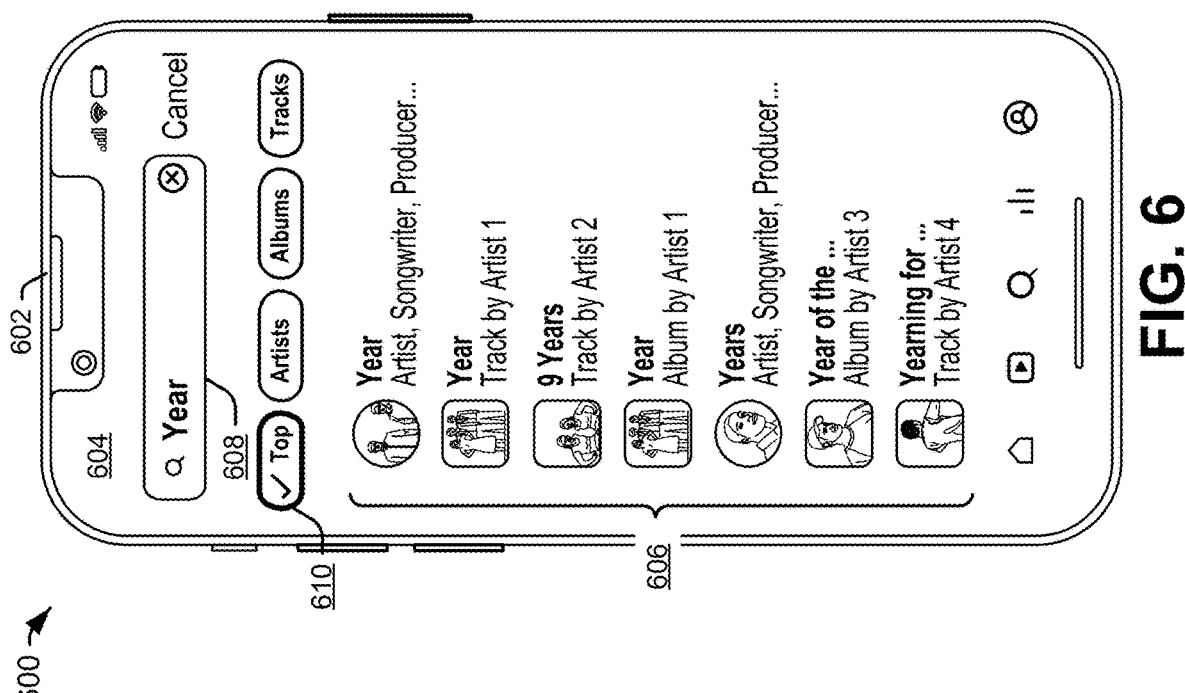

FIG. 6 depicts a non-limiting example 600 of a user interface for search ranking media content items in accordance with one or more implementations.

The illustrated example 600 depicts a computing device 602 displaying a user interface 604 for access by a user (e.g., a user 104 as described with reference to FIGS. 1 and 2). In this example 600, the computing device 602 receives a ranked list 406 including search results for media content.

A user can interact with a search feature 608 of the user interface 604 to input a string value and/or a character value. For example, the user inputs a string value "Year" into the search feature 608 when searching for a media content item (e.g., a music track with a name "Year 100" by an Artist 5). The computing device 602 can send the input to a media content service provider system. In some examples, the computing device 602 sends input to the media content service provider system after the user enters character values of the string value. The media content service provider system can determine a ranked list 606 for the input, such that the string value "Year" can result in four different ranked lists 606 (e.g., a ranked list for "Y," a ranked list for "Ye," a ranked list for "Yea," and a ranked list for "Year"). The user interface 604 can include additional interactive elements, such as one or more selectable features 610 (e.g., selectable buttons) to indicate to the media content service provider system a preference for ranking type of media content item in the ranked list 606. For example, the user selects "Top," as shown in FIG. 6, to indicate to the media content service provider system to sort the media content items independent of type. If the user selected "Artists," "Albums," and/or "Tracks," the media content service provider system sorts media content items with a type of artist, album, and/or track higher up on the ranked list 606 depending on the selection.

In some examples, the ranked list 606 includes any numerical quantity of media content items. For example, the ranked list 606 includes an artist with a name "Year," a track with a name "Year" by an Artist 1, a track with a name "9 Years" by an Artist 2, an album with a name "Year" by an Artist 1, an artist with a name "Years," an album with a name "Year of the . . . " by an Artist 3, and a track with a name "Yearning for . . . " by an Artist 4. The ranked list 606 is ranked according to the popularity value stored in a popularity average dataset, such as a popularity average dataset 328, as described with reference to FIG. 3.

In some examples, the media content service provider system uses current popularity values of media content items to determine where to place the media content item in the ranked list 606. However, using current popularity values of media content items results in a newly released media content item being absent from the list due to a popularity value of the newly released media content item being relatively low or zero. For example, the newly released media content item could be relatively popular compared with the other media content items in the ranked list 606, however because the newly released media content item is within a cold start period, the media content service provider system ranks the newly released media content item relatively low on the ranked list 606 or omits the newly released media content item from the ranked list 606 altogether. To prevent additional searches for the newly released media content item and to improve user experience and improve efficiency of use of computational resources, the media content service provider system can use an estimated popularity value for the newly released media content item to initialize the popularity value of the newly released media content item during the cold start period, which is described in further detail with respect to FIG. 7.

Figure 7:
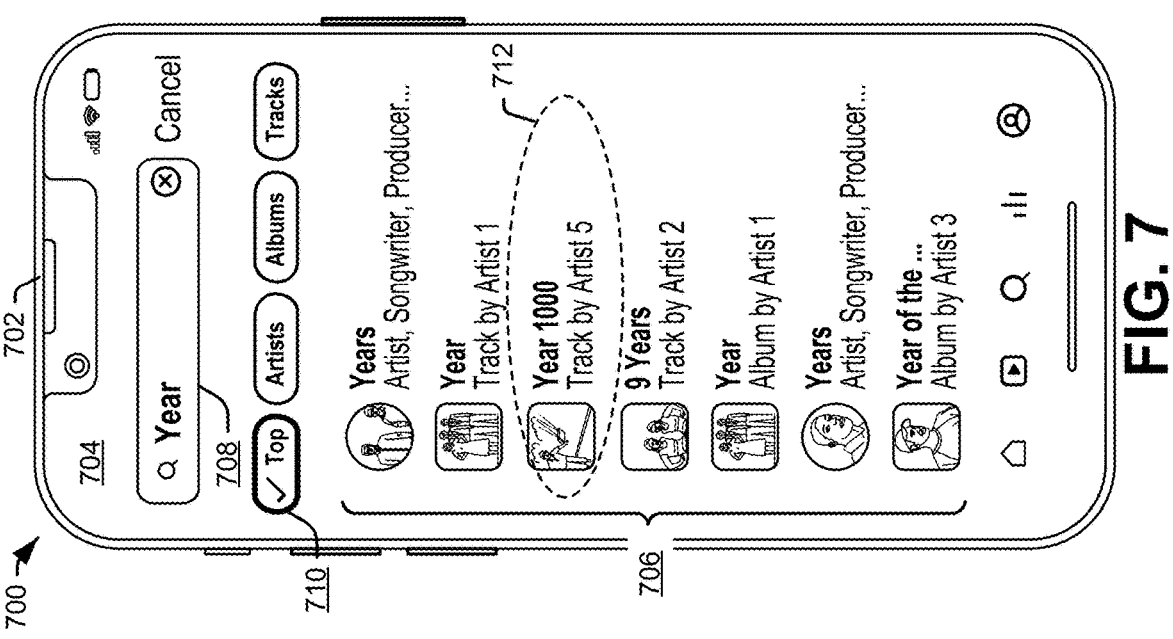

FIG. 7 depicts a non-limiting example 700 of a user interface for search ranking media content items in accordance with one or more implementations.

The illustrated example 700 depicts a computing device 702 displaying a user interface 704 for access by a user (e.g., a user 104 as described with reference to FIGS. 1 and 2). In this example 700, the computing device 702 receives a ranked list 706 including search results for media content.

A user can interact with a search feature 708 of the user interface 704 to input a string value and/or a character value. For example, the user inputs a string value "Year" into the search feature 708 when searching for a media content item (e.g., a music track with a name "Year 100" by an Artist 5). The computing device 702 can send the input to a media content service provider system. In some examples, the computing device 702 sends input to the media content service provider system after the user enters character values of the string value. The media content service provider system can determine a ranked list 706 for the input, such that the string value "Year" can result in four different ranked lists 706 (e.g., a ranked list for "Y," a ranked list for "Ye," a ranked list for "Yea," and a ranked list for "Year"). The user interface 704 can include additional interactive elements, such as one or more selectable features 710 (e.g., selectable buttons) to indicate to the media content service provider system a preference for ranking type of media content item in the ranked list 706. For example, the user can select "Top," as shown in FIG. 7, to indicate to the media content service provider system to sort the media content items independent of type. If the user selected "Artists," "Albums," and/or "Tracks," the media content service provider system sorts media content items with a type of artist, album, and/or track higher up on the ranked list 706 depending on the selection.

In some examples, the ranked list 706 includes any numerical quantity of media content items. For example, the ranked list 706 includes an artist with a name "Year," a track with a name "Year" by an Artist 1, a track with a name "Year 1000" by an Artist 5, a track with a name "9 Years" by an Artist 2, an album with a name "Year" by an Artist 1, an artist with a name "Years," and an album with a name "Year of the . . . " by an Artist 3. The ranked list 706 is ranked according to the popularity value stored in a popularity average dataset, such as a popularity average dataset 328, as described with reference to FIG. 3.

In some examples, the media content service provider system uses an estimated popularity value for the newly released media content items (e.g., media content items within a cold start period). The media content service provider system can use current popularity values for the media content items that are not within the cold start period. The estimated popularity values and the current popularity values correspond to a location of the media content item in the ranked list 706. Thus, a newly released media content item 712 can be ranked relatively high on the ranked list 706 if the artist and one or more previously released albums of the artist are relatively popular. For example, the media content service provider system determines the newly released media content item 712 is relatively popular compared with the other media content items in the ranked list 706 (e.g., one or more of the track with a name "9 Years" by the Artist 2, the album with the name "Year" by the Artist 1, the artist with the name "Years," or the album with the name "Year of the . . . " by the Artist 3) using the estimated popularity value for the newly released media content item 712. Thus, the user may be able to locate and select a newly released media content item 712 from a ranked list 706 with fewer searches, which reduces computational resources used to populate search results, as well as improves user experience by decreasing an amount of time it takes for the user to locate a popular newly released media content item 712. By decreasing the amount of manual input, a user device of the user searching for the media content processes fewer inputs thereby decreasing the use of processing resources (e.g., processor cores, memory, etc.) and the burden on such resources, which can improve battery life of the user device and/or enable the user device to perform other tasks.

Figure 8:
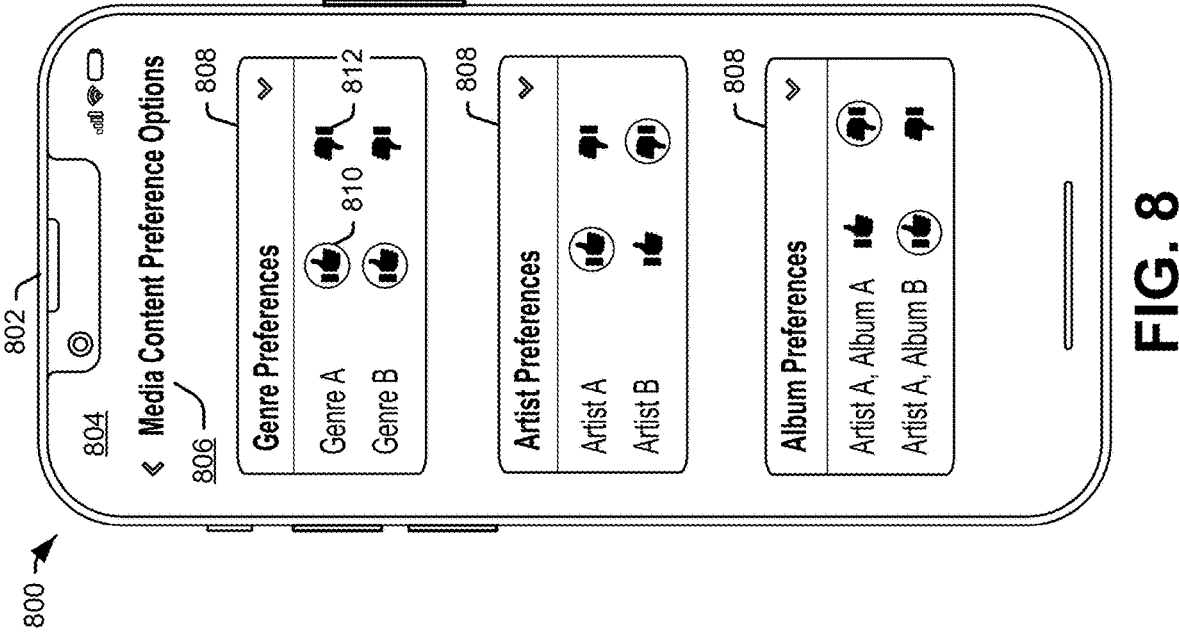

FIG. 8 depicts a non-limiting example 800 of a user interface for search ranking media content items in accordance with one or more implementations.

The illustrated example 800 depicts a computing device 802 displaying a user interface 804 for access by a user (e.g., a user 104 as described with reference to FIGS. 1 and 2). In this example 800, the computing device 802 can display one or more selectable features to provide for a user to input one or more preferences related to artists of media content items, albums including media content items, genres of media content items, or the like.

In some examples, a user may navigate an interactive menu by scrolling, clicking, or otherwise selecting one or more features of the interactive menu. For example, the interactive menu displays one or more settings options, including media content preference options 806. The user may select the media content preference options 806, and the computing device 802 can display the user interface 804 to the user. The user interface 804 can include additional interactive elements, such as the drop-down menus 808.

In some examples, the user inputs one or more preferences related to media content items by providing input via the drop-down menus 808. For example, a user may select one or more icons indicative of a preference towards (e.g., a like or a dislike of) an item on the drop-down menu 808 by clicking on the icon. The icons can include a positive preference icon 810 and/or a negative preference icon 812.

The user may indicate a genre preference by selecting an option to expand the drop-down menu 808 labeled with "Genre Preferences." Expanding the drop-down menu 808 can cause the user interface 804 to display different types of genres, such as the Genre A and the Genre B. Although the drop-down menu 808 is illustrated as displaying two genre types, the drop-down menu 808 can display any numerical quantity of genre types. A user may indicate a preference for one or more of the genre types by selecting a positive preference icon 810 and/or a negative preference icon 812 for the genre types. For example, the user indicates a positive preference for the Genre A and the Genre B by selecting the positive preference icons 810.

The user may indicate an artist preference by selecting an option to expand the drop-down menu 808 labeled with "Artist Preferences." Expanding the drop-down menu 808 can cause the user interface 804 to display names of different artists, such as the Artist A and the Artist B. Although the drop-down menu 808 is illustrated as displaying two artists, the drop-down menu 808 can display any numerical quantity of artists. In some examples, the artists displayed on the drop-down menu 808 includes artists belonging to genre types that the user indicated a positive preference for via the drop-down menu 808 for genre preferences. A user may indicate a preference for one or more of the artists by selecting a positive preference icon 810 and/or a negative preference icon 812 for the artists. For example, the user may indicate a positive preference for the Artist A by selecting a positive preference icon 810 and a negative preference for the Artist B by selecting a negative preference icon 812.

The user may indicate an album preference by selecting an option to expand the drop-down menu 808 labeled with "Album Preferences." Expanding the drop-down menu 808 can cause the user interface 804 to display names of different albums, such as an Album A of Artist A and an Album B of Artist A. Although the drop-down menu 808 is illustrated as displaying two albums by one artist, the drop-down menu 808 can display any numerical quantity of albums by any numerical quantity of artists. In some examples, the albums displayed on the drop-down menu 808 includes albums by artists that the user indicated a positive preference for via the drop-down menu 808 for artist preferences. A user may indicate a preference for one or more of the albums by selecting a positive preference icon 810 and/or a negative preference icon 812 for the album. For example, the user indicates a positive preference for the Album B by selecting a positive preference icon 810 and a negative preference for the Album A by selecting a negative preference icon 812.

In some examples, the user indicates a preference for any type of media content items via drop-down menus 808. The computing device 802 can report the user input from the drop-down menus 808 to a media content service provider system for use by a popularity value estimation system. For example, the popularity value estimation system estimates a popularity value for one or more media content times by using the preferences to increase the popularity value for media content items that have a positive preference by the user and to decrease the popularity value for media content items that have a negative preference by the user. In some examples, the popularity value estimation system removes media content items that have a negative preference from search results sent to the computing device 802, thus providing enhanced personalization in search results for the user conducting the search.

Figure 9:
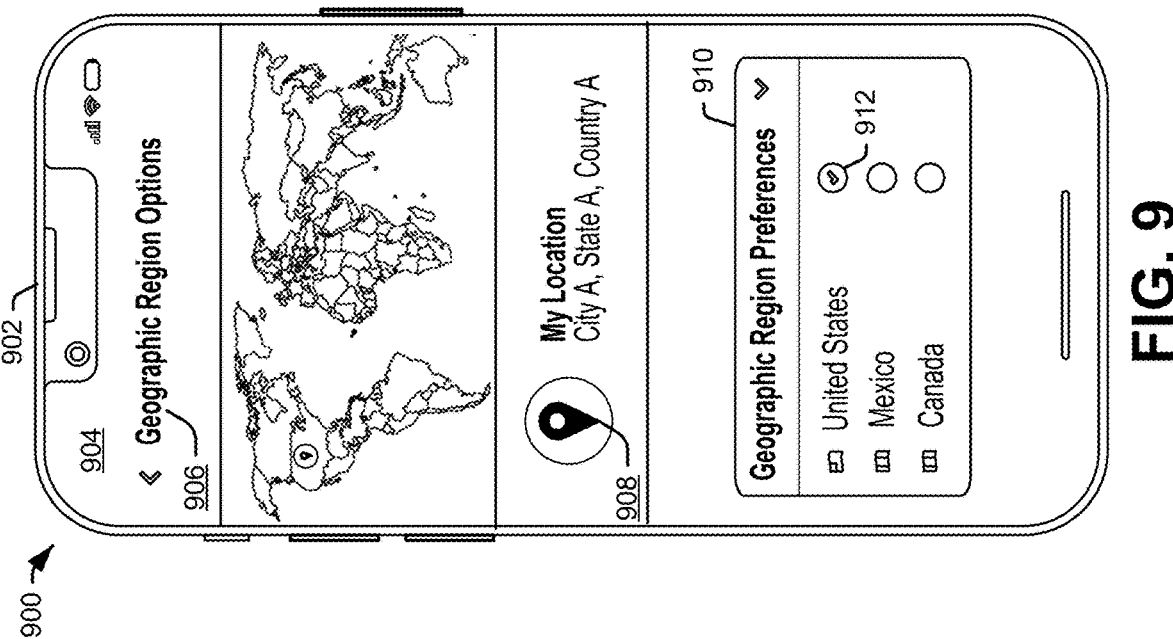

FIG. 9 depicts a non-limiting example 900 of a user interface for search ranking media content items in accordance with one or more implementations.

The illustrated example 900 depicts a computing device 902 displaying a user interface 804 for access by a user (e.g., a user 104 as described with reference to FIGS. 1 and 2). In this example 900, the computing device 902 can display one or more geographic region options 906 to a user, where the user can specify a geographic region via the user interface 904.

In some examples, a user navigates an interactive menu by scrolling, clicking, or otherwise selecting one or more features of the interactive menu. For example, the interactive menu displays one or more settings options, including geographic region options 906. The user may select the geographic region options 906, and the computing device 902 can display the user interface 904 to the user. The user interface 904 can include a display of a current location 908 of the user, which can include a label of "My Location," a city, a state, and a country. For example, the current location 908 of a user of the computing device 902 is City A, State A, and Country A. The computing device 902 can determined the current location 908 by using location information from application data, or other data, tracked by the computing device 902.

In some examples, the user interface 904 displays one or more interactive elements, such as a drop-down menu 910 displaying geographic region preferences for selection by the user. In some examples, the drop-down menu 910 is expanded to display geographic regions. The user may select one or more of the geographic regions. For example, the user selects a geographic region "United States" by clicking an icon 912. The geographic regions can include cities, states, countries, continents, or any other geographic region.

The computing device 902 can report the user input from the drop-down menu 910 to a media content service provider system for use by a popularity value estimation system. For example, the popularity value estimation system estimates a popularity value for one or more media content times by using the indicated geographic region to determine an artist popularity value for that geographic region, to determine an album popularity value for that geographic region, and/or to determine a current popularity value of the media content item in that geographic region.

FIG. 10 depicts a procedure 1000 in an example implementation of search ranking media content items in accordance with one or more implementations.

At 1002, a media content item that is previously absent from a media content library of the media content platform is received by a media content platform. The media content item is associated with an artist popularity value of an artist of the media content item.

In one or more implementations, the media content item includes one or more of a music track, a music album, a music artist, or any other audio or video media content item. In some examples, a database is accessed to obtain, or retrieve, the artist popularity value of the artist of the media content item. In some cases, the artist popularity value is determined to be zero based on the database failing to include the artist. In some other cases, if the database fails to include the artist (e.g., the main artist), then the database is accessed to obtain, or retrieve, an artist popularity value of a secondary artist of the media content item, a producer of the media content item, or a writer of the media content item.

At 1004, a popularity value of the media content item is estimated based on the artist popularity value and one or more album popularity values for one or more albums of the artist released prior to the media content item and based on an elapsed duration after receiving the media content item satisfying a threshold duration (e.g., cold start period). The one or more album popularity values are weighted based on a recency of release of the one or more albums by the artist. A release date of the media content item and an availability date of the media content item are within the threshold duration. In some examples, the threshold duration includes one or more of a configured numerical quantity of days after receiving the media content item or a configured numerical quantity of days after a release date of the media content item.

In some examples, a decay factor is applied to the estimated popularity value. The decay factor is determined based on the elapsed duration (e.g., directly proportional to the elapsed duration). In some examples, the decay factor is applied after an initial elapsed duration, the initial elapsed duration being subsequent to receiving the media content item (e.g., an offset measured in a numerical quantity of days). In some examples, the estimated popularity value is used for ranking the search results until a current popularity value of the media content item is a same value as the estimated popularity value, which is referred to as convergence. For example, a current popularity value is obtained and compared to the estimated popularity value to determine if there is convergence. In some other examples, the estimated popularity value is used for ranking the search results until the estimated popularity value is within a threshold value of zero. In some cases, the estimated popularity value of the media content item is stored at a database associated with the media content platform, as described with reference to FIG. 3. In one or more implementations, the estimated popularity value is based on user interaction with one or more of media content items associated with the artist, the one or more albums, or media content items associated with a genre of the media content item.

In some examples, the media content item is associated with multiple artists. The artist is selected from the multiple artists based on comparing respective artist popularity values for the multiple artists. The artist with the greatest value of the respective artist popularity values is selected. The artist popularity value and the one or more album popularity values are determined based on selecting the artist. In some cases, one or more of the artist popularity value or the one or more album popularity values are associated with a geographic region. The one or more albums include media content items different from the media content item.

In some examples, at 1006, a determination is made by the media content service provider system about whether a search request is received from a user account of the media content platform. If not (e.g., "No"), then the media content service provider system can store the estimated popularity value of the media content item and continue to monitor for receiving a media content item previously absent from the media content library. The search request corresponds to at least one media content item of the media content library. The search request includes one or more of a string value or a character value associated with the string value. In some examples, the string value corresponds to one or more of a title (e.g., a name) of the media content item, the artist of the media content item, or an album of the media content item.

If a search request is received (e.g., "Yes"), then at 1008, one or more search results are populated in response to the search request. The one or more search results include the media content item and one or more additional media content items ranked based on the estimated popularity value of the media content item and respective popularity values of the one or more additional media content items.

In some examples, invalid media content items are removed from the one or more search results prior to populating the one or more search results. The media content items are invalid if a respective artist popularity value of artists of the invalid media content items satisfy a threshold value (e.g., are below a threshold), a respective current popularity value of the invalid media content items being greater than or equal to a respective estimated popularity value of the invalid media content items (e.g., convergence), or a validity status of the artists of the invalid media content items. An artist can have a validity status of valid if the artist is not blacklisted. The artist can have a validity status of invalid if the artist is blacklisted.

In one or more implementations, populating the one or more search results includes outputting the one or more search results for display at a user interface, as described with reference to FIGS. 4 through 7.

In some cases, an additional search request to search for the media content item is received. The elapsed duration after receiving the media content item fails to satisfy the threshold duration when the additional search request is received (e.g., the media content item is not within the cold start period). A database associated with the media content platform is accessed to obtain respective current popularity values for the media content item and the one or more additional media content items based on the elapsed duration failing to satisfy the threshold duration. One or more additional search results are populated in response to the additional search request. The one or more additional search results include the media content item and the one or more additional media content items ranked based on the respective current popularity values.

FIG. 11 depicts a procedure 1100 in an example implementation of search ranking media content items in accordance with one or more implementations.

At 1102, a media content item associated with a media content library of the media content platform is received by a media content platform. In some cases, the media content item is previously absent from the media content library and is associated with an artist popularity value of an artist of the media content item.

In one or more implementations, the media content item includes one or more of a music track, a music album, a music artist, or any other audio or video media content item. In some examples, a database is accessed to obtain, or retrieve, the artist popularity value of the artist of the media content item. In some cases, the artist popularity value may be determined to be zero based on the database failing to include the artist. In some other cases, if the database fails to include the artist (e.g., the main artist), then the database is accessed to obtain, or retrieve, an artist popularity value of a secondary artist of the media content item.

At 1104, a determination is made as to whether an elapsed duration after a date (e.g., a release date) of the media content item satisfies a threshold duration (e.g., the cold start period).

If the date satisfies the threshold duration (e.g., "Yes"), then at 1106, a first popularity estimation technique is selected for estimating the popularity of the media content item. The first popularity estimation technique includes calculating the popularity value of the media content item based on an artist popularity value of an artist of the media content item and one or more album popularity values for one or more albums of the artist released prior to the media content item. In one or more implementations, the album popularity values are weighted based on a recency of release of the albums by the artist. In some examples, a decay factor is applied to the estimated popularity value. The decay factor is determined based on the elapsed duration (e.g., directly proportional to the elapsed duration). In some examples, the decay factor is applied after an initial elapsed duration, the initial elapsed duration being subsequent to receiving the media content item (e.g., an offset measured in a numerical quantity of days). In some examples, if an availability date of the media content item is within the threshold duration, the media content item satisfies the threshold duration.

In some examples, the media content item is associated with multiple artists. The artist is selected from the multiple artists based on comparing respective artist popularity values for the multiple artists. The artist with the greatest value of the respective artist popularity values is selected. The artist popularity value and the one or more album popularity values are determined based on selecting the artist. In some cases, one or more of the artist popularity value or the one or more album popularity values are associated with a geographic region. The one or more albums include media content items different from the media content item.

If the date fails to satisfy the threshold duration (e.g., "No"), then at 1108 a second popularity estimation technique is selected for estimating the popularity of the media content item. The second popularity estimation technique includes obtaining the popularity value of the media content item from a database (e.g., a current popularity value of the media content item). In one or more implementations, the popularity value is based on a numerical quantity of searches for the media content item.

In some examples, the media content platform uses a combination of the first popularity estimation technique and the second popularity estimation technique, such as to determine an estimated popularity value as described with reference to FIG. 3.

At 1110, a search request is received from a user account of the media content platform. The search request corresponds to at least one media content item of the media content library. The search request includes one or more of a string value or a character value associated with the string value. In some examples, the string value corresponds to one or more of a title (e.g., a name) of the media content item, the artist of the media content item, or an album of the media content item.

At 1112, one or more search results are populated in response to the search request. A popularity value of the media content item is estimated using the first popularity estimation technique and/or the second popularity estimation technique according to the determination at 1104. In some examples, the threshold duration includes one or more of a configured numerical quantity of days after receiving the media content item or a configured numerical quantity of days after a release date of the media content item.

In some examples, the first popularity estimation technique is used for ranking the search results until a current popularity value of the media content item is a same value as the estimated popularity value, which is referred to as convergence. For example, a current popularity value is obtained and compared to the estimated popularity value to determine if there is convergence. After convergence occurs, the second popularity estimation technique is used. In some other examples, the first popularity estimation technique is used for ranking the search results until the estimated popularity value is within a threshold value of zero, and then the second popularity estimation technique is used. In some cases, the estimated popularity value of the media content item is stored at a database associated with the media content platform, as described with reference to FIG. 3. In one or more implementations, the estimated popularity value is based on user interaction with one or more of media content items associated with the artist, the one or more albums, or media content items associated with a genre of the media content item.

The one or more search results include the media content item and one or more additional media content items ranked based on the estimated popularity value of the media content item and respective popularity values of the one or more additional media content items.

In some examples, invalid media content items are removed from the one or more search results prior to populating the one or more search results. The media content items are invalid if a respective artist popularity value of artists of the invalid media content items satisfy a threshold value (e.g., are below a threshold), a popularity value of the media content items estimated using the second popularity estimation techniques being greater than or equal to a respective popularity value of the media content items estimated using the first popularity estimation techniques (e.g., convergence), or a validity status of the artists of the invalid media content items. An artist can have a validity status of valid if the artist is not blacklisted. The artist can have a validity status of invalid if the artist is blacklisted.

In one or more implementations, populating the one or more search results includes outputting the one or more search results for display at a user interface, as described with reference to FIGS. 4 through 7.

Figure 12:
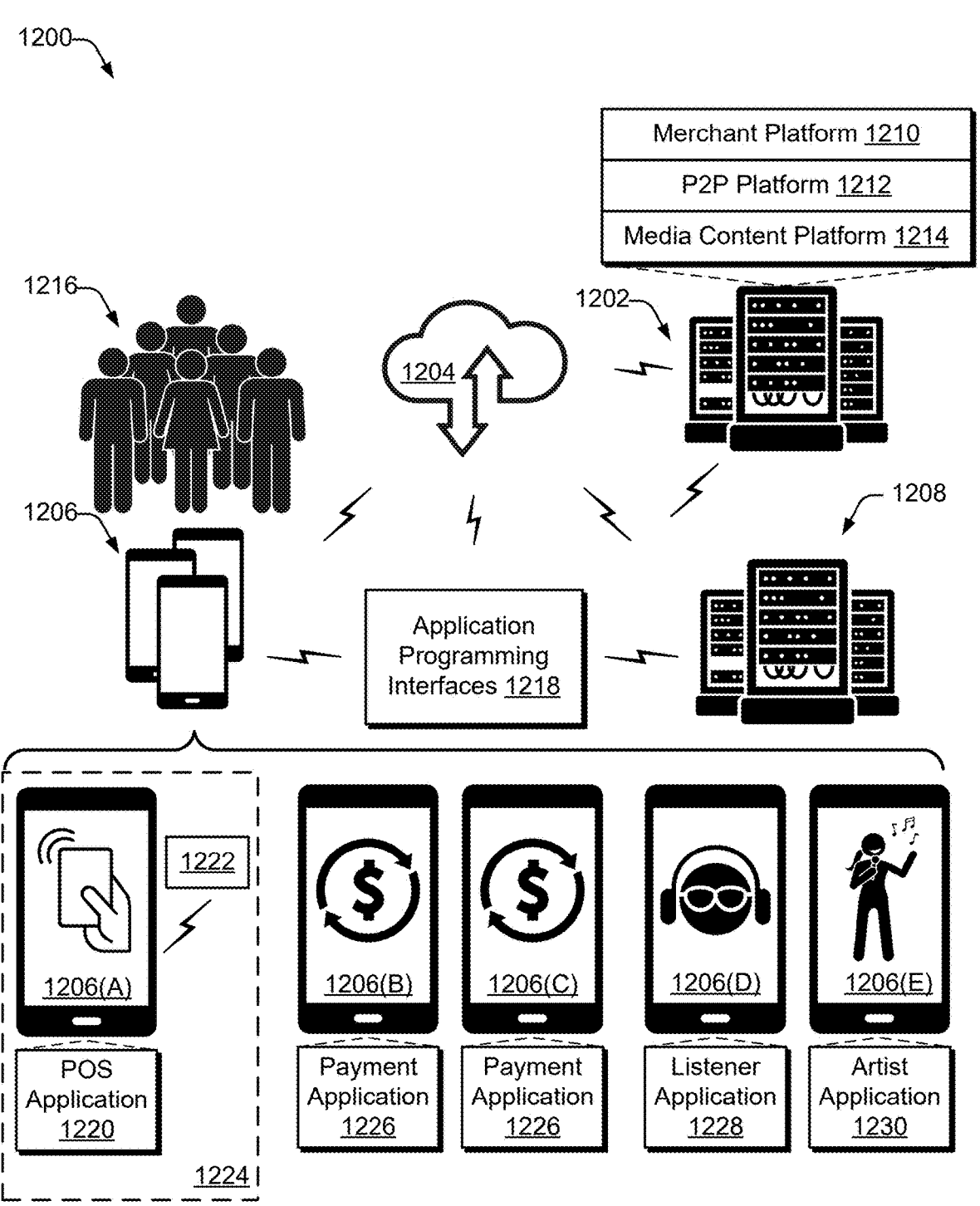
FIG. 12 illustrates an example environment in which search ranking media content items techniques described herein are performed in accordance with one or more implementations.

FIG. 12 illustrates an example environment 1200 in which search ranking media content items techniques described herein are performed in accordance with one or more implementations. The environment 1200 includes server(s) 1202 that can communicate over a network 1204 with end user devices 1206 and/or server(s) 1208 associated with third-party service provider(s). In various examples, the end user devices 1206 may comprise one or more seller devices 1206(A), one or more user devices 1206(B) and/or 1206(C) in a peer network, one or more content consumption devices

1206(D), one or more artist devices 1206(E), combinations of these examples, or other categories of user devices. The server(s) 1202 can be associated with one or more service providers that can provide one or more services for the benefit of users 1216, as described below. For example, the server(s) 1202 may enable services of service providers such as in association with a seller platform 1210 (which may further include a buyer platform), a peer-to-peer (P2P) payment platform 1212, a media content platform 1214, a combination of these platforms, or other platforms associated with other service providers. While services and features are referenced throughout in connection with a particular one of the seller platform 1210, the P2P payment platform 1212, or the media content platform 1214, it should be understood that any of these platforms may perform the functionality described in relation to any of the other platforms. Actions attributed to the service provider(s) can be performed by the server(s) 1202.

In the context of the previously described figures, for example, at least a portion of the server(s) 1202 may be used to implement the media content platform 126 and/or various portions of the media content service provider system 102.

In some examples, individual ones of the end user devices 1206 can be operable by users 1216. The users 1216 (individually referred to herein as "user 1216") can be referred to as customers, buyers, merchants, sellers, borrowers, employees, employers, payors, payees, couriers, artists, musicians, listeners, fans, supervisors, hosts, audience members, and so on. The users 1216 can interact with the end user devices 1206 via user interfaces presented via the end user devices 1206. In at least one example, a user interface can be presented via a web browser, or the like. Alternatively, or additionally, a user interface can be presented via an application, such as a mobile application or desktop application, which can be provided by the seller platform 1210, the P2P payment platform 1212, and/or the media content platform 1214, or which can be an otherwise dedicated application. In some examples, individual end user devices 1206 can have an instance or versioned instance of an application, which can be downloaded from an application store, for example, which can present the user interface(s) described herein.

In at least one example, the users 1216 can include merchants that can operate the seller device(s) 1206(A) that are configured for use by merchants. For the purpose of this discussion, a "merchant" can be any entity that offers items (e.g., goods or services) for purchase or other means of acquisition (e.g., rent, borrow, barter, etc.). The merchants can offer items for purchase or other means of acquisition via brick-and-mortar stores, mobile stores (e.g., pop-up shops, food trucks, etc.), online stores, event venues, combinations of the foregoing, and so forth. In some examples, at least some of the merchants can be associated with the same entity but can have different merchant locations and/or can have franchise/franchisee relationships.

In additional or alternative examples, the merchants can be different merchants. For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

The seller device 1206(A) can have an instance of a point of sale ("POS") application 1220 stored thereon. The POS application 1220 can configure the seller device 1206(A) as a POS terminal, which enables the merchant to interact with one or more customers. In at least one example, interactions between the customers and the merchants that involve the exchange of funds (from the customers) for items or services (from the merchants) can be referred to as "transactions." In at least one example, the POS application 1220 can determine transaction data associated with the POS transactions. Transaction data can include payment information, which can be obtained from a reader device 1222 associated with the seller device 1206(A), user authentication data, purchase amount information, point-of-purchase information (e.g., item(s) purchased, date of purchase, time of purchase, subscription type, etc.), etc. The POS application 1220 can send transaction data to the server(s) 1202 such that the server(s) 1202 can track transactions of the customers, merchants, and/or the users 1216 over time. Furthermore, the POS application 1220 can present a UI to enable the merchant to interact with the POS application 1220 and/or the seller platform 1210 via the POS application 1220.

In at least one example, the seller device 1206(A) can be a special-purpose computing device configured as a POS terminal (via the execution of the POS application 1220). In at least one example, the POS terminal may be connected to a reader device 1222, which is capable of accepting a variety of payment instruments, such as credit cards, debit cards, gift cards, short-range communication-based payment instruments, and the like, as described below. In at least one example, the reader device 1222 can plug in to a port in the seller device 1206(A), such as a microphone port, a headphone port, an audio-jack, a data port, or other suitable port. In additional or alternative examples, the reader device 1222 can be coupled to the seller device 1206(A) via another wired or wireless connection, such as via Bluetooth®, BLE, and so on. In some examples, the reader device 1222 can be a software solution executing on the POS terminal, e.g., a mobile phone. In some examples, the reader device 1222 can read information from alternative payment instruments including, but not limited to, wristbands and the like.

In some examples, the reader device 1222 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards, hardware wallets, fobs, or devices configured for tapping). The POS terminal may provide a rich user interface, communicate with the reader device 1222, and communicate with the seller platform 1210, which can provide, among other services, a payment processing service. The server(s) 1202 associated with the seller platform 1210 can communicate with server(s) 1208, as described below. In this manner, the POS terminal and reader device 1222 may collectively process transaction(s) between the merchants and customers. In some examples, multiple POS terminal(s) may be connected to a number of other devices, such as "secondary" terminals, e.g., back-of-the-house systems, printers, line-buster devices, reader devices, speakers, and the like, to allow for information from the secondary terminal to be shared between the primary POS terminal(s) and secondary terminal(s), for example via short-range communication technology. This kind of arrangement may continue operation in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1222 of the POS system 1224 are shown as separate devices, in additional or alternative examples, the POS terminal and the reader device 1222 can be part of a single device. In some examples, the reader device 1222 can have a display integrated therein for presenting information to customers of a merchant. In additional or alternative examples, the POS terminal can have a display integrated therein for presenting information to the customers of the merchant. POS systems, such as the POS system 1224, may be mobile, such that POS terminals and reader devices may process transactions in disparate locations across the world. POS systems can be used for processing card-present transactions and card-not-present (CNP) transactions.

A card-present transaction is a transaction where both a customer and the customer's payment instrument are physically present at the time of the transaction. Card-present transactions may be contact or contactless transactions processed by swipes (e.g., by sliding a magnetic strip through a reader device), dips (e.g., by inserting an embedded microchip into a reader device), taps (e.g., by wirelessly, through Bluetooth, NFC or other short range technology hover or tap a payment instrument into a reader device), or any other interaction between a physical payment instrument (e.g., a card), or otherwise present payment instrument, and a reader device 1222, whereby the reader device 1222 is able to obtain payment data from the payment instrument.

A CNP transaction is a transaction where a card, or other payment instrument, is not physically present at the POS such that payment data is manually keyed in (e.g., by a merchant, customer, etc.), or payment data is required to be recalled from a card-on-file data store, to complete the transaction.

The POS system 1224, the server(s) 1202, and/or the server(s) 1208 may exchange payment information and transaction data to determine whether transactions are authorized. For example, the POS system 1224 may provide encrypted payment data, user authentication data, purchase amount information, point-of-purchase information, etc. (collectively, transaction data) to server(s) 1202 over the network(s) 1204. The server(s) 1202 may send the transaction data to the server(s) 1208.

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa, MasterCard®), and can be part of a card payment network. In at least one example, the service provider can serve as an acquirer and connect directly with the card payment network.

The card payment network (e.g., the server(s) 1208 associated therewith) can forward the fund transfer request to an issuing bank (e.g., "issuer"). The issuer is a bank or financial institution that offers a financial account (e.g., credit or debit card account) to a user. The issuer (e.g., the server(s) 1208 associated therewith) can make a determination as to whether the customer has the capacity to absorb the relevant charge associated with the payment transaction. In at least one example, the seller platform 1210 can serve as an issuer and/or can partner with an issuer. The transaction is either approved or rejected by the issuer and/or the card payment network (e.g., the server(s) 1208 associated therewith), and a payment authorization message is communicated from the issuer to the POS device via a path opposite of that described above, or via an alternate path.

The server(s) 1208 may send an authorization notification over the network(s) 1204 to the server(s) 1202, which may send the authorization notification to the POS system 1224 over the network(s) 1204 to indicate whether the transaction is authorized. The server(s) 1202 may also transmit additional information such as transaction identifiers to the POS system 1224. In one example, the server(s) 1202 may include a merchant application and/or other functional components for communicating with the POS system 1224 and/or the server(s) 1208 to authorize or decline transactions (e.g., the API 1218). In examples, the seller platform 1210 can enable the merchants to receive cash payments, payment card payments, and/or electronic payments from customers for POS transactions and the service provider can process transactions on behalf of the merchants.

Based on the authentication notification that is received by the POS system 1224 from server(s) 1202, the merchant may indicate to the customer whether the transaction has been approved. In some examples, approval may be indicated at the POS system 1224, for example, at a display of the POS system 1224. In some cases, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

The seller platform 1210 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, media content (e.g., music, videos, etc.) management and/or subscription services, and so on. In some examples, the user devices 1206 can access all of the services. In some cases, the user devices 1206 can have gradated access to the services, which can be based on risk tolerance, IDV outputs, subscriptions, and so on. In at least one example, access to such services can be availed to the merchants via the POS application 1220. In additional or alternative examples, various services can be associated with their own access point (e.g., application, web browser, etc.).

As the seller platform 1210 processes transactions on behalf of the merchants, the seller platform 1210 can maintain accounts or balances for the merchants in one or more ledgers. For example, the seller platform 1210 can analyze transaction data received for a transaction to determine an amount of funds owed to a merchant for the transaction and deposit funds into an account of the merchant. The account can have a stored balance, which can be managed by the seller platform 1210. The account can be different from a conventional bank account at least because the stored balance is managed by a ledger of the seller platform 1210 and the associated funds are accessible via various withdrawal channels including, but not limited to, scheduled deposit, same-day deposit, instant deposit, and a linked payment instrument.

A scheduled deposit can occur when the seller platform 1210 transfers funds associated with a stored balance of the merchant to a bank account of the merchant that is held at a bank or other financial institution (e.g., associated with the server(s) 1208). Scheduled deposits can occur at a prearranged time after a POS transaction is funded, which can be a business day after the POS transaction occurred, or sooner or later. In some examples, the merchant can access funds prior to a scheduled deposit (e.g., same-day deposits and/or real-time deposits). Further, in at least one example, the merchant can have a payment instrument that is linked to the stored balance that enables the merchant to access the funds without first transferring the funds from the account managed by the seller platform 1210 to the bank account of the merchant.

In at least one example, the seller platform 1210 may provide inventory management services. That is, the seller platform 1210 may provide inventory tracking and reporting. Inventory management services may enable the merchant to access and manage a database storing data associated with a quantity of items that the merchant has available (i.e., an inventory). Furthermore, in at least one example, the seller platform 1210 can provide catalog management services to enable the merchant to maintain a catalog, which can be a database storing data associated with items that the merchant has available for acquisition (i.e., catalog management services). The seller platform 1210 can offer recommendations related to pricing of the items, placement of items on the catalog, and multi-party fulfillment of the inventory, to name a few examples.

In at least one example, the seller platform 1210 can provide business banking services, which allow the merchant to track deposits (from payment processing and/or other sources of funds) into an account of the merchant, payroll payments from the account (e.g., payments to employees of the merchant), payments to other merchants (e.g., business-to-business) directly from the account or from a linked debit card, withdrawals made via scheduled deposit and/or real-time deposit, configure allocations among multiple balances or accounts (e.g., spending, saving, taxes, etc.), etc. Furthermore, the business banking services can enable the merchant to obtain a customized payment instrument (e.g., credit card), check how much money the merchant is earning (e.g., via presentation of available earned balance), understand where the money of the merchant is going (e.g., via deposit reports (which can include a breakdown of fees), spend reports, etc.), access/use earned money (e.g., via scheduled deposit, real-time deposit, linked payment instrument, etc.), have improved control of the money of the merchant (e.g., via management of deposit schedule, deposit speed, linked instruments, etc.), etc. Moreover, the business banking services can enable the merchants to visualize their cash flow to track their financial health, set aside money for upcoming obligations (e.g., savings), organize money around goals, etc.

In at least one example, the seller platform 1210 can provide financing services and products, such as via business loans, consumer loans, fixed term loans, flexible term loans, and the like. In at least one example, the service provider can utilize one or more risk signals to determine whether to extend financing offers and/or terms associated with such financing offers. Such risk signals can be particular to an individual platform or service, as described herein, or can be based on aggregated data associated with multiple of the platforms or services. In at least one example, the seller platform 1210 can provide financing services for offering and/or lending a loan to a borrower that is to be used for, in some instances, financing the borrower's short-term operational needs (e.g., a capital loan). Additionally or alternatively, the seller platform 1210 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant. The seller platform 1210 can generate the loan based at least in part on determining that the borrower purchased or intends to purchase the item from the merchant. Advances, loans, or other funds provided to a merchant or other user can be repaid via a variety of mechanisms. In some examples, loans can be repaid in installments (e.g., multiple payments over time), at a particular date, from a portion of incoming funds (e.g., payments processed for the merchant, tax refunds, direct deposits, etc.), or the like.

The seller platform 1210 can provide web-development services, which enable users 1216 who are unfamiliar with HTML, XML, Javascript, CSS, or other web design tools to create and maintain functional websites. Further, in addition to websites, the web-development services can create and maintain other online omni-channel presences, such as social media posts for example. In some examples, the resulting web page(s) and/or other content items can be used for offering item(s) for sale via an online/e-commerce platform. In at least one example, the seller platform 1210 can recommend and/or generate content items to supplement omni-channel presences of the merchants.

Furthermore, the seller platform 1210 can provide payroll services to enable employers to pay employees for work performed on behalf of employers. In at least one example, the seller platform 1210 can receive data that includes time worked by an employee (e.g., through imported timecards and/or POS interactions), sales made by the employee, gratuities received by the employee, and so forth. Based on such data, the seller platform 1210 can make payroll payments to employee(s) on behalf of an employer via the payroll service. For instance, the seller platform 1210 can facilitate the transfer of a total amount to be paid out for the payroll of an employee from the bank of the employer to the bank of the seller platform 1210 to be used to make payroll payments. In at least one example, when the funds have been received at the bank of the seller platform 1210, the seller platform 1210 can pay the employee, such as by check or direct deposit.

Moreover, in at least one example, the seller platform 1210 can provide employee management services for managing schedules of employees. Further, the seller platform 1210 can provide appointment services for enabling users 1216 to set schedules for scheduling appointments and/or users 1216 to schedule appointments.

In some examples, the seller platform 1210 can provide restaurant management services to enable users 1216 to make and/or manage reservations, to monitor front-of-house and/or back-of-house operations, and so on. In such examples, the seller device(s) 1206(A) and/or server(s) 1202 can be configured to communicate with one or more other computing devices, which can be located in the front-of-house (e.g., POS device(s)) and/or back-of-house (e.g., kitchen display system(s) (KDS)). In at least one example, the seller platform 1210 can provide order management services and/or fulfillment services to enable restaurants (or other merchant types) to manage open tickets, split tickets, and so on and/or manage fulfillment services.

In some examples, the seller platform 1210 can provide omni-channel fulfillment services. A fulfillment service includes item ordering and delivery services, such as via a courier. In some examples, the courier can be an unmanned aerial vehicle (e.g., a drone), an autonomous vehicle, or any other type of vehicle capable of receiving instructions for traveling between locations. For instance, if a customer places an order with a merchant and the merchant cannot fulfill the order because one or more items are out of stock or otherwise unavailable, the seller platform 1210 can leverage other merchants and/or sales channels that are part of the seller platform 1210 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the seller platform 1210 can enable conversational commerce via conversational commerce services, which can use one or more machine learning mechanisms to analyze messages exchanged between two or more users 1216, voice inputs into a virtual assistant or the like, to determine intents of user(s) 1216. In some examples, the seller platform 1210 can utilize determined intents to automate customer service, offer promotions, provide recommendations, or otherwise interact with customers in real-time. In at least one example, the seller platform 1210 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1216 may be new to the seller platform 1210 such that the user 1216 that has not registered (e.g., subscribed to receive access to one or more services offered by the seller platform 1210) with the seller platform 1210. The seller platform 1210 can offer onboarding services for registering a potential user 1216 with the seller platform 1210. In some examples, onboarding can involve presenting various questions, prompts, and the like to a potential user 1216 to obtain information that can be used to generate a profile for the potential user 1216. In at least one example, the seller platform 1210 can provide limited or short-term access to its services prior to, or during, onboarding (e.g., a user of a peer-to-peer payment service can transfer and/or receive funds prior to being fully onboarded, a merchant can process payments prior to being fully onboarded, a user of a music streaming service can listen to music having advertisement breaks prior to being fully onboarded, etc.). In response to full or partial completion of onboarding, any limited or short-term access to services of the seller platform 1210 can be transitioned to more permissive (e.g., less limited) or longer-term access to such services.

The seller platform 1210 can be associated with IDV services, which can be used by the seller platform 1210 for compliance purposes and/or can be offered as a service, for instance to third-party service providers (e.g., associated with the server(s) 1208). That is, the seller platform 1210 can offer IDV services to verify the identity of users 1216 seeking to use or using their services. Identity verification may involve requesting a customer (or potential customer)

to provide information that is used by compliance departments to prove that the information is associated with an identity of a real person or entity (e.g., an artist). In at least one example, the seller platform 1210 can perform services for determining whether identifying information provided by a user 1216 accurately identifies the customer (or potential customer).

Techniques described herein can be configured to operate in both real-time/online and offline modes. "Online" modes refer to modes when devices are capable of communicating with the seller platform 1210 while offline mode refers to modes when devices are unable to communicate with the server(s) 1208 due to network connectivity issue, for example. In such examples, devices may operate in "offline" mode where at least some payment data is stored (e.g., on the seller device(s) 1206(A)) and/or the server(s) 1202 until connectivity is restored and the payment data can be transmitted to the server(s) 1202 and/or the server(s) 1208 for processing.

In at least one example, the seller platform 1210 can be associated with a hub, such as an order hub, an inventory hub, a fulfillment hub and so on, which can enable integration with one or more additional service providers (e.g., associated with the additional server(s) 1208). In some examples, such additional service providers can offer additional or alternative services and the service provider can provide an interface or other computer-readable instructions to integrate functionality of the service provider into the one or more additional service providers.

Turning now to the P2P functionality provided by the environment 1200, the P2P platform 1212 can provide a peer-to-peer payment service that enables peer-to-peer payments between two or more of the users 1216. Two or more of the users 1216 may be considered "peers" in a peer-to-peer interaction, such as a payment. In at least one example, the P2P platform 1212 can communicate with instances of a payment application 1226 (or other access point) installed on end user devices 1206 configured for operation by the users 1216. In an example, an instance of the payment application 1226 executing on a first user device 1206(B) operated by a payor (e.g., one of the users 1216) can send a request to the P2P platform 1212 to transfer an asset (e.g., fiat currency, non-fiat currency, digital assets such as non-fungible tokens (NFTs), cryptocurrency, securities, gift cards, and/or related assets) from the payor to a payee (e.g., a different one of the users 1216) via a peer-to-peer payment. In some examples, assets associated with an account of the payor are transferred to an account of the payee. In some examples, assets can be held at least temporarily in an account of the P2P platform 1212 prior to transferring the assets to the account of the payee.

Figure 13:
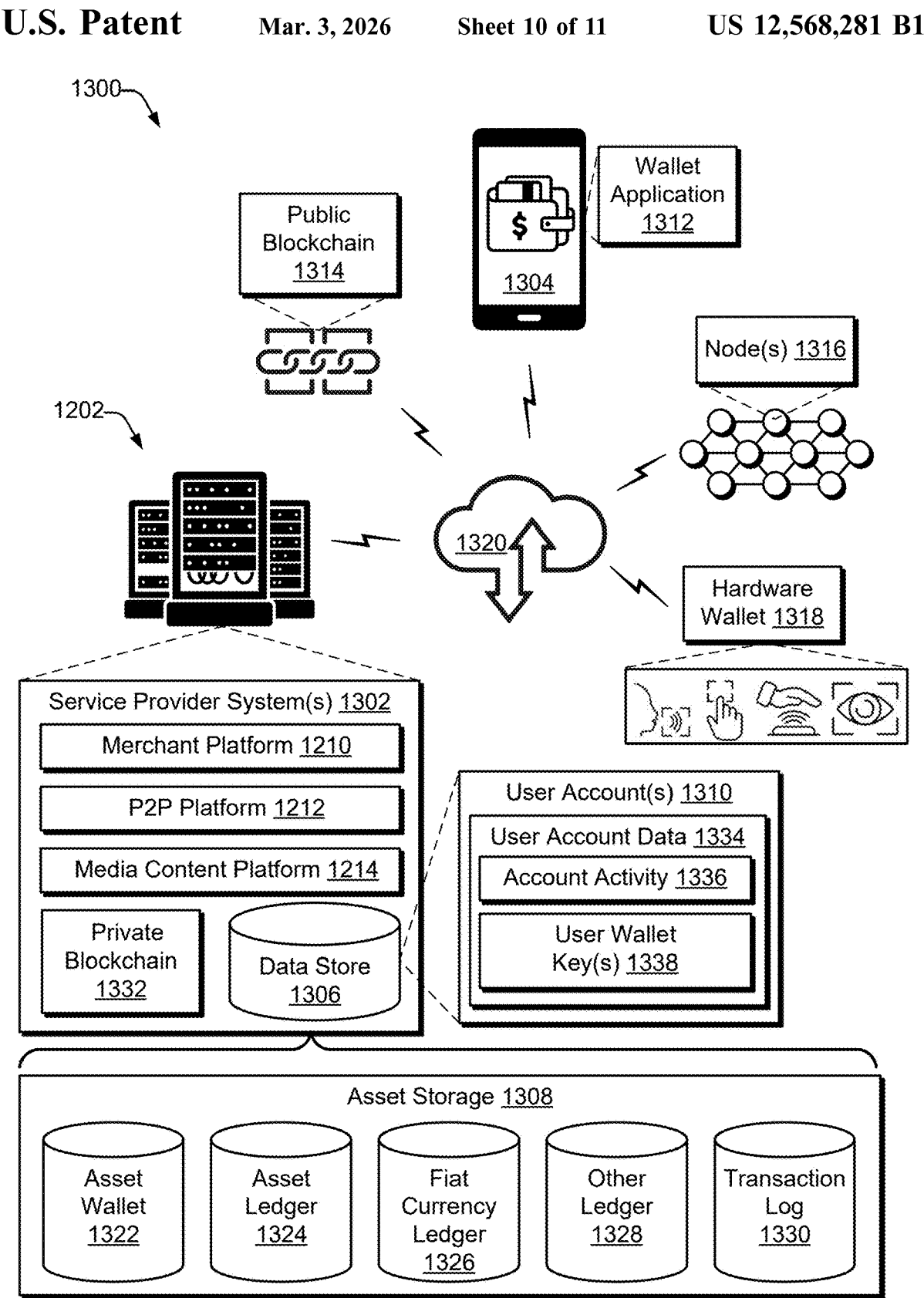
FIG. 13 illustrates an example environment in which search ranking media content items techniques described herein are performed in accordance with one or more implementations.

In some examples, the P2P platform 1212 can utilize a ledger system to track transfers of assets between users 1216. FIG. 13, below, provides additional details associated with such a ledger system. The ledger system can enable users 1216 to own fractional shares of assets that are not conventionally available. For instance, a user can own a fraction of a Bitcoin, an NFT, or a stock. Additional details are described herein.

In at least one example, the P2P platform 1212 can facilitate transfers and can send notifications related thereto to instances of the payment application 1226 executing on user device(s) of payee(s). As an example, the P2P platform 1212 can transfer assets from an account of a first user to an account of a second user and can send a notification to the user device 1206(B) of the second user for presentation via a user interface. The notification can indicate that a transfer is in process, a transfer is complete, or the like. In some examples, the P2P platform 1212 can send additional or alternative information to the instances of the payment application 1226 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the P2P platform 1212 funds the request to payee on behalf of the payor, to speed up the transfer process and compensate for lags that may be attributed to the payor's financial network.

In some examples, the P2P platform 1212 can trigger the peer-to-peer payment process through identification of a "payment proxy" having a particular syntax. The payment proxy is useable in lieu of payment data. That is, payment data and a payment proxy can be linked to, or otherwise associated with, a user account of a user and either can be used for making payments. In an example, the syntax can include a monetary currency indicator prefixing one or more alphanumeric characters (e.g., $Cash). The currency indicator operates as the tagging mechanism that indicates to the server(s) 1202 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol or other symbol could equally be used. In some examples, additional or alternative identifiers can be used to trigger the peer-to-peer payment process. For instance, email, telephone number, social media handles, artist, or band names, and/or the like can be used to trigger and/or identify users of a peer-to-peer payment process.

In some examples, the peer-to-peer payment process can be initiated through instances of the payment application 1226 executing on the end user devices 1206. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can be a uniform resource locator (URL), which can include a payment proxy discussed above. The P2P platform 1212 can generate the landing page to enable the recipient to conveniently receive one or more payments from one or more senders.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through streaming of content, comments, posts, messages on electronic bulletin boards, messages on a social networking platform, and/or any other types of messages. In some examples, the content provider can be the service provider as described with reference to FIG. 12 or a third-party service provider associated with the server(s) 1208. In examples where the content provider is a third-party service provider, the server(s) 1208 can be accessible via one or more APIs 1218 or other integrations. In some examples, "forum" may also refer to an application or webpage of an e-commerce or retail organization that offers products and/or services. Such websites can provide an online "form" to complete before or after the products or services are added to a virtual cart. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be internal to the P2P platform 1212 (e.g., the P2P platform 1212 offers a chat or messaging service that is within the payment application or accessible via the payment application). In some examples, the messaging application can be external to the P2P platform 1212. (e.g., the messaging application is hosted by a third-party service provider associated with the server(s) 1208, which can be accessible via one or more of the APIs 1218 or other integrations). The messaging application can include, for example, a text messaging application for communication between phones (e.g., conventional mobile telephones or smartphones), or a cross-platform instant messaging application for smartphones and phones that use the Internet for communication.

Funds received from payments can be stored in stored balances that are linked to, or otherwise associated with, user accounts. In some examples, the P2P platform 1212 can enable users 1216 to perform banking transactions via instances of the payment application 1226. For example, users can configure direct deposits, recurring deposits, or other deposits (e.g., tax refunds, loans, etc.) for adding assets to their various ledgers/balances. In some examples, users can deposit physical cash via ATMs or other deposit sources, which can include merchants, such as those merchants that utilize the payment processing system described above. In some examples, the P2P platform 1212 can enable users to allocate funds between different accounts, sub-accounts, or balances (e.g., spending, saving, different assets, different currencies), etc. Further, users 1216 can configure bill pay, recurring payments, and/or the like using assets associated with their accounts. In some examples, the P2P platform 1212, with consent of the user, can track individual transactions made using the payment application and can utilize such transaction data to make personalized or customized recommendations, determine creditworthiness, generate tax documentation, and/or the like.

In addition to sending and/or receiving assets via peer-to-peer transactions, the P2P platform 1212 enables users to buy and/or sell assets via asset networks such as cryptocurrency networks, securities networks, and/or the like. In some examples, acquisition of such assets can be in whole or fractional shares. The ledger system described below with reference to FIG. 13 can enable such assets to be acquired in fractional shares and/or in real-time or near real-time (by delaying or omitting the need to buy/sell assets via asset networks or exchanges). In some examples, users can "gift" assets to other users, for example, by transferring cryptocurrency, stocks, or the like to one another.

In some examples, the P2P platform 1212 can enable users to link payment instruments to their user accounts. As a result, users can use their linked payment instruments to access funds in their accounts or balances. In some examples, the payment instrument can be a credit card, debit card, card linked to multiple accounts or balances via software or hardware, a fob or other object having payment data stored thereon, or the like. In some examples, the payment instrument can be a virtual payment instrument or a physical payment instrument. In some examples, the virtual payment instrument can be issued in real-time or for temporary usage. In some examples, the virtual payment instrument can have the same or different payment data as a corresponding physical payment instrument. Payment instruments can be customizable using a design user interface of the payment application. Such customization can enable users to select colors, stamps, images, text, or the like for surface(s) of their payment instruments. In some examples, users can draw or otherwise interact with the design user interface to personalize surface(s) of their payment instruments.

In some examples, users can associate incentives with their payment instruments. Incentives can be recommended to users based on user preferences (inferred or explicitly identified), geolocation, propensity to redeem, value, and/or the like. In some examples, incentives can be particular to individual merchants, types of merchants, types of transactions, and/or the like. In at least one example, when a user uses their payment instrument at a merchant or type of merchant associated with an incentive, or for a transaction type associated with an incentive, the P2P platform 1212 can automatically apply the incentive to the transaction. In some examples, users can gift other users "gift cards" that can be associated with payment instruments. That is, a user can transfer an amount of funds to another user and such funds can be associated with a condition (e.g., merchant, merchant type, transaction type, location, etc.) that, upon satisfaction, enables the amount of funds, or a portion thereof, to be applied to a transaction. In at least one example, when a user uses their payment instrument for a transaction that satisfies the condition, the P2P platform 1212 can automatically apply the amount of funds associated with the gift card to the transaction.

In some examples, users can configure their account such that when they use their payment instruments, the P2P platform 1212 can deposit an amount of funds into a savings account, investing account, bitcoin account, or the like.

In some examples, users can search for or browse other users, merchants, items, or the like via the payment application. In some examples, search results can be personalized and/or customized for the user (e.g., based on user data collected with consent of the user). In some examples, users can shop or otherwise purchase items from other users, merchants, or the like from within the payment application or via a deep link to a merchant application or website.

The P2P platform 1212 can offer primary and secondary accounts, wherein a primary account is a sponsor or other delegate of one or more secondary accounts. Such accounts can be useful for families, wherein a parent or other guardian is a sponsor or delegate to one or more child accounts, or where a child is a sponsor or delegate of an elderly parent's account. In some examples, primary accounts can establish limits on secondary accounts, such as spending limits, or the like. In some examples, the primary account owner is the user legally responsible for the account and their identity may be verifiable for secondary user accounts to perform certain transactions, such as buying/selling cryptocurrency or stocks. In some examples, one or more primary accounts and one or more secondary accounts can form a "group" with shared goals, such as saving, investing, or the like.

The P2P platform 1212 can present activity data via an activity user interface of the payment application. In some examples, activity can be presented by merchant, date, time, amount, or the like. In some examples, interactions between entities can be represented in conversational communications such that an interaction or transaction is represented as a message. In some examples, users can interact with individual messages and/or send/request funds from within such a conversational communication. In some examples, such conversational communications can represent conversations of a group of two or more users. Groups can be used to pool funds, obtain group discounts or incentives, or enable multiple users to participate in financial transactions together (e.g., group investing, group savings, etc.).

The P2P platform 1212 can offer a variety of financial training or learning opportunities. In some examples, such training or learning can be personalized for individual users, for example, based on user data and/or transaction data of the user that is obtained with consent of the user. In some examples, such user data and/or transaction data can be analyzed to make actionable recommendations with respect to optimizing financial health of users of the P2P platform 1212.

In some examples, components of the environment 1200 may be integrated to enable payments at the point-of-sale using assets associated with user accounts of the P2P platform 1212. As illustrated in the environment 1200, the components can communicate with one another via the network 1204, where one or more APIs 1218 or other functional components can be used to facilitate such communication.

In at least one example, an integration can enable a customer to participate in a transaction via their own computing device (e.g., user device 1206(B)) instead of interacting with a merchant device of a merchant, such as the seller device 1206(A). In such an example, the POS application 1220, associated with a payment processing platform and executable by the seller device 1206(A) of the merchant, can present a Quick Response (QR) code, or other code that can be used to identify a transaction (e.g., a transaction code), in association with a transaction between the customer and the merchant. The QR code, or other transaction code, can be provided to the POS application 1220 via an API 1218 associated with the peer-to-peer payment platform. In an example, the customer can utilize their own computing device, such as the user device 1206(B), to capture the QR code, or the other transaction code, and to provide an indication of the captured QR code, or other transaction code, to server(s) 1202.

Based at least in part on the integration of the peer-to-peer payment platform and the payment processing platform (e.g., via the API 1218), the server(s) 1202 of the seller platform 1210 can exchange communications with a payment application 1226 associated with the P2P platform 1212 and/or the POS application 1220 to process payment for the transaction using a peer-to-peer payment where the customer is a first "peer" and the merchant is a second "peer."

Based at least in part on receiving an indication of which payment method a user (e.g., customer or merchant) intends to use for a transaction, techniques described herein utilize an integration between the P2P platform 1212 and seller platform 1210 (which can be a first- or third-party integration) such that a QR code, or other transaction code, specific to the transaction can be used for providing transaction details, location details, customer details, or the like to a computing device of the customer, such as the user device 1206(B), to enable a contactless (peer-to-peer) payment for the transaction, and transferring funds from an account of the customer to an account of the merchant.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1206(B), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1220 and the payment application 1226, as described herein, can process a payment transaction by routing information input via the merchant application to the payment application for completing a "frictionless" payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. A customer computing device, such as the user device 1206(B), can be specially configured as a buyer-facing device having functionality similar to the functionality described above in the brick-and-mortar example.

In some examples, based at least in part on capturing the QR code, or other transaction code, the seller platform 1210 can provide transaction data to the P2P platform 1212 for presentation via the payment application 1226 on the computing device of the customer, such as the user device 1206B (B), to enable the customer to complete the transaction via their own computing device. In some examples, in response to receiving an indication that the QR code, or other transaction code, has been captured or otherwise interacted with via the customer computing device, the P2P platform 1212 can determine that the customer authorizes payment of the transaction using funds associated with a stored balance of the customer that is managed and/or maintained by the P2P platform 1212. Such authorization can be implicit such that the interaction with the transaction code can imply authorization of the customer. Alternatively, or additionally, the P2P platform 1212 can request express authorization to process payment for the transaction using the funds associated with the stored balance and the customer can interact with the payment application to expressly authorize the settlement of the transaction. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly, or explicitly) of the customer, the P2P platform 1212 can transfer funds from the stored balance of the customer to the seller platform 1210. In at least one example, the seller platform 1210 can deposit the funds, or a portion thereof, into a stored balance of the merchant that is managed and/or maintained by the seller platform 1210. In such an example, the seller platform 1210 can be a "peer" to the customer in a peer-to-peer transaction.

In some examples, techniques described herein can enable the customer to interact with the transaction after payment for the transaction has been settled. For example, in at least one example, the seller platform 1210 can cause a total amount of a transaction to be presented via a user interface associated with the payment application 1226 such that the customer can provide gratuity, feedback, loyalty information, or the like, via an interaction with the user interface. In another example, the seller platform 1210 can adjust a total amount of a transaction based on events during a shopping experience, such as adding or removing a charge to the total amount based on whether a media content item requested by the customer to be played during a shopping experience was in fact played. In some examples, because the customer has already authorized payment via the P2P platform 1212, if the customer inputs a tip and/or an event affecting the total amount of the transaction is triggered, the P2P platform 1212 can transfer additional funds, associated with the tip or event, to the seller platform 1210. This pre-authorization (or maintained authorization) of sorts can enable faster, more efficient payment processing when the tip is received and/or the event initiates the trigger. Further, the customer can provide feedback and/or loyalty information via the user interface presented by the payment application, which can be associated with the transaction. Using the pre-authorization techniques described herein results in fewer data transmissions and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1226 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. In some examples, the payment instrument can be associated with the P2P platform 1212 as described herein (e.g., a debit card linked to a stored balance of a customer) such that when the payment instrument is caused to interact with a payment reader, the seller platform 1210 can exchange communications with the P2P platform 1212 to authorize payment for a transaction and/or provision associated transaction data to a computing device of the customer associated with the transaction.

Turning now to media content functionality provided by the environment 1200, the media content platform 1214 can provide digital media to a content consumption device 1206(D) where playback may occur using "streaming." In examples, "streaming" media content involves encoding the media content and transmitting the encoded media content over the network 1204 to a media player or a media application executing on a device (e.g., via a speaker). The device then decodes and plays the media content while data is being received. In some cases, a buffer queues some of the data of the media content (e.g., audio data, video data, etc.) ahead of the media being played. During moments of network congestion, which leads to lower available bandwidth, less media content data is added to the buffer, which drains down as media content is being dequeued during streaming playback. However, during moments of high network bandwidth, the buffer is replenished, adding media content data to the buffer.

In at least one example, the media content platform 1214 can provide a digital media streaming service (e.g., subscription-based, non-subscription-based) that enables a content consumption device 1206(D) to stream and/or download digital media content via a listener application 1228 installed on the content consumption device 1206(D). For instance, the media content platform 1214 may comprise a digital audio streaming service (e.g., for music, podcasts, audiobooks, etc.), a digital video streaming service, and/or a streaming service that provides streaming of various different types of digital media content or multimedia. In such cases where digital media content items are downloaded and stored locally on the content consumption devices 1206(D), the listener application 1228 may verify access rights to the digital media content items at time intervals, for instance intermittently (e.g., when the content consumption device 1206(D) has a network connection with the media content platform 1214 via the network(s) 1204), and/or at regular intervals (e.g., daily, weekly, monthly, etc.). In examples, access rights to the digital media content items may be provided when a subscription to the media content platform 1214 is active, while access rights to the digital media content items may be withheld when the subscription to the media content platform 1214 is terminated. Enabling storage on the end user devices 1206 and subsequent access to digital media content items via the listener application 1228 provides the users 1216 with the ability to access the digital media content items "offline" such as when a connection to the media content platform 1214 via the network(s) 1204 is unavailable or unreliable.

In some examples, the media content platform 1214 may additionally or alternatively provide an artist management service that enables the users 1216 to manage aspects of artist business via an artist application 1230 installed on the artist device 1206(E), such as data analytics and management (e.g., listener data, consumer data, etc.), marketing, regulatory obligations, cash flow management, publishing, customer relationship management (CRM), social media, event coordination, industry communications, digital media content ingestion and storage, and so forth. In some cases, the users 1216 can have graduated access to the services, which can be based on a user type (e.g., artist, group member, personal manager, business manager, attorney, agent, etc.), risk tolerance, artist verification status, listener and/or viewer analytics (e.g., number of streams in a month), and so on. In some cases, multiple users 1216 may have access to a single user account via respective end user devices 1206, with the various users having different access privileges to services provided by the artist management service. In various scenarios, an artist can designate functions provided by the artist management service to different members of the team associated with the artist, thus granting the respective team members access to services suited to the skills of the individual team members.

In some cases, the artist application 1230 and the listener application 1228 may be distinct applications having differing user experiences and verification processes for access, such as illustrated in the environment 1200. For instance, the media content platform 1214 may request additional verification, such as a link to an artist website, a sample of an artist's work, a verified credential supplied by a third party, etc. to grant access to the artist application 1230 in addition to information requested to access the listener application 1228. Further, the artist application 1230 may provide the artist management services described herein, without the subscription-based digital media streaming services described herein, and vice versa. However, examples are also considered in which functionality provided by the artist application 1230 and the listener application 1228 partially or fully overlap, and/or where verification processes for access are substantially similar.

In at least some examples, the media content platform 1214 enables interaction between the users 1216 utilizing the listener application 1228 installed on the content consumption devices 1206(D), and the users 1216 utilizing the artist application 1230 installed on the artist devices 1206 (E). For example, the media content platform 1214 may provide interconnectivity between the subscription-based digital media streaming service and the artist management service. Functionality provided by the media content platform 1214 in such instances may include a communication channel between one or more of the users 1216 (e.g., a listener, fan, music supervisor, publisher, etc.) utilizing the listener application 1228 and another user (e.g., an artist) of the users 1216 utilizing the artist application 1230. The communication channel may include, for instance, a messaging platform (also referred to as a "messaging application" herein), a live streaming platform, a videoconferencing or teleconferencing platform, and/or a combination of these.

Additionally, in some cases, the media content platform 1214 may facilitate a resource transfer between the listener application 1228 and the artist application 1230. In an example, the media content platform 1214 may direct a resource, such as a portion of a subscription fee paid by one of the users 1216 designated as a listener, to one or more of the users 1216 designated as artists based on a number of instances that the listening user consumed (e.g., streamed, downloaded, etc.) content created by respective ones of the artist users. Alternatively, or additionally, the media content platform 1214 may direct a resource, such as funds, from an account associated with a listening user to an account associated with an artist user (or vice versa), in accordance with transfers between accounts as described herein. The media content platform 1214 may facilitate resource transfers in examples such as merchandise purchases, event ticket purchases, "tipping" an artist, payments for royalties or other fees, and so forth.

In some examples, the media content platform 1214 enables interaction between individual ones of the users 1216 with one another via the listener application 1228 installed on the content consumption device 1206(D) and other of the content consumption devices 1206(D) via a communication channel as described above. In an example, the listener application 1228 may provide functionality via a communication channel for a user to stream an individual digital media item, a playlist, or the like to an audience comprising other ones of the content consumption devices 1206(D). Alternatively, or additionally, the communication channel may facilitate sharing of individual digital media items, playlists, user and/or artist profiles, and the like between the users 1216 via messages, uniform resource locators (URLs), quick response (QR) codes, and so forth.

In some cases, the media content platform 1214 enables interaction between individual ones of the users 1216 with one another via the artist application 1230 installed on the artist device 1206(E) and other of the artist devices 1206 via a communication channel as described above. In some instances, the media content platform 1214 may provide recommendations for a particular user indicating which of the other users 1216 to communicate with. Such a recommendation may be based on a similarity (or dissimilarity) of content created by two or more of the users 1216, an overlap (or lack thereof) of audience members of the users 1216, a geographic location of the users 1216, a coinciding event location of the users 1216, and so forth. In some examples, a user may input parameters for a desired connection via the artist application 1230, and the media content platform 1214 may filter which of the users 1216 to surface for recommendations to the user based on the input parameters. Alternatively, or additionally, the media content platform 1214 may implement one or more machine learning models to filter which of the users 1216 to surface for recommendations to the user. The recommendations provided by the media content platform 1214 may be data driven and thus increase relevance of communications presented to the users 1216 and reduce unsolicited communications that may be received by the users 1216.

The media content platform 1214 may interact with the server(s) 1208 associated with the third-party service providers to, for instance, ingest digital media items, report digital media consumption data, pay royalties, and the like. In some examples, the server(s) 1208 may be accessible by the media content platform 1214 via one or more APIs 1218 or other integrations. In some cases, the third-party service provider may be a digital media content provider (e.g., a record label, a performance rights organization (PRO), an independent artist, etc.). In such cases, the media content platform 1214 may receive digital media content items from the server(s) 1208, along with metadata associated with the digital media content items. The metadata, in some instances, may indicate individual contributors to a digital media content item such as an artist or artists, a songwriter (e.g., a composer, lyricist, author, etc.), a producer (which may further include a co-producer, a mastering engineer, a mixing engineer, a recording engineer, an arranger, a programmer, etc.), a musician (e.g., instrumentalist, vocalist, etc.), a visual artist, and so forth, with an indication of the role of the individual contributor. Alternatively, or additionally, the metadata may indicate information such as release date, track title, track duration, clean or explicit version, jurisdiction information, and the like. The media content platform 1214 may use the metadata to associate the digital media content item as being created by a particular user, to provide search results to the users 1216, to generate playlists, and so forth. Further, the media content platform 1214 may provide payments (e.g., royalties) to the third-party service provider based on a number of streams and/or downloads of individual digital media content items by the users via the listener application 1228.

Techniques described herein are directed to services provided via a distributed system of end user devices 1206 that are in communication with server(s) 1202 of the service provider. That is, techniques described herein are directed to a specific implementation—or a practical application—of utilizing a distributed system of end user devices 1206 that are in communication with server(s) 1202 of the seller platform 1210, the P2P platform 1212, and/or the media content platform 1214 to perform a variety of services, as described above. The unconventional configuration of the distributed system described herein enables the server(s) 1202 that are remotely-located from end-users (e.g., users 1216) to intelligently offer services based on aggregated data associated with the end-users, such as the users 1216 (e.g., data associated with multiple, different merchants and/or multiple, different buyers; data associated with multiple different listeners and/or multiple different artists, etc.), in some examples, in near-real time. Accordingly, techniques described herein are directed to a particular arrangement of elements that offer technical improvements over conventional techniques for performing payment processing services, P2P payment services, media content services, and the like. For small business owners and artists in particular, the business environment is typically fragmented and relies on unrelated tools and programs, making it difficult for an owner or an artist to manually consolidate and view such data. The techniques described herein constantly or periodically monitor disparate and distinct user accounts, e.g., accounts within the control of the seller platform 1210, the P2P platform 1212, and/or the media content platform 1214, and those outside of the control of these service providers, to track the standing (payables, receivables, payroll, invoices, appointments, capital, balances, collaborations, etc.) of the users 1216. The techniques herein provide a consolidated view of a user's cash flow, predict needs, preemptively offer recommendations of services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services, P2P payment services, media content services, and/or additional or alternative services described herein. In some implementations, the distributed system is capable of applying the intelligence derived from an existing user base to a new user, thereby making the onboarding experience for the new user personalized and frictionless when compared to traditional onboarding methods. Further, models or algorithms that are used to implement techniques described herein may be retrained over time to improve outcomes for subsequent scenarios based on outcomes of previous scenarios. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1216 and end user devices 1206. Furthermore, such features are changed dynamically based on the profiles of the users involved interacting with the GUIs. As such, techniques described herein are directed to improvements to computing systems.

The seller platform 1210, the P2P platform 1212, and/or the media content platform 1214 are capable of providing additional or alternative services, and the services described above are offered as a sampling of services. In at least one example, the seller platform 1210, the P2P platform 1212, and/or the media content platform 1214 can exchange data with the server(s) 1208 associated with third-party service providers. Such third-party service providers can provide information that enables the seller platform 1210, the P2P platform 1212, and/or the media content platform 1214 to provide services, such as those described above. In additional or alternative examples, such third-party service providers can access services of the seller platform 1210, the P2P platform 1212, and/or the media content platform 1214. That is, in some examples, the third-party service providers can be subscribers, or otherwise access, services of the seller platform 1210, the P2P platform 1212, and/or the media content platform 1214.

FIG. 13 illustrates an example environment 1300 including a service provider system 1302 which may be associated with the server(s) 1202 of FIG. 12. The environment 1300 may also include a user device 1304, which may correspond to any of the end user devices 1206 described in relation to FIG. 12. In examples, the service provider system 1302 may include one or a combination of the seller platform 1210, the P2P platform 1212, or the media content platform 1214, as well as one or more data store(s) 1306 that can store assets in an asset storage 1308, as well as data in user account(s) 1310. In some examples, the environment 1300 may also include a public blockchain 1314, one or more nodes 1316, and/or a hardware wallet 1318. The service provider system 1302, the user device 1304, public blockchain 1314, the node(s) 1316, and the hardware wallet 1318 may be connected and able to communicate via one or more networks 1320, which may have the same or similar functionality described in relation to the network 1204 of FIG. 12.

In some examples, user account(s) 1310 can include merchant account(s), customer account(s), media content subscriber account(s), artist account(s), and so forth. In at least one example, the asset storage 1308 can be used to record whether individual assets are registered to a user account 1310. For example, the asset storage 1308 can include asset wallet(s) 1322 for storing records of assets owned by the service provider system 1302, such as cryptocurrency, securities, NFTs, or the like, and communicating with one or more asset networks, such as cryptocurrency networks, NFT networks, securities networks, or the like. In some examples, the asset network can be a first-party network or a third-party network, such as a cryptocurrency exchange or the stock market. In examples where the asset network is a third-party network, the server(s) 1208 of FIG. 12 can be associated therewith.

The asset wallet 1322 can be associated with one or more addresses and can vary addresses used to acquire assets (e.g., from the asset network(s)) so that its holdings are represented under a variety of addresses on the asset network. In examples where the service provider system 1302 has holdings of cryptocurrency (e.g., in the asset wallet 1322), a user can acquire cryptocurrency directly from the service provider system 1302. In some examples, the service provider system 1302 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In some scenarios, the buying and selling of cryptocurrency, and therefore the associated updating of the public ledger of an asset network can be separate from a customer-merchant transaction or a peer-to-peer transaction, and therefore not necessarily time-sensitive. This can enable batching transactions to reduce computational resources and/or costs. The service provider system 1302 can provide the same or similar functionality for securities or other assets.

The asset storage 1308 may contain ledgers that store records of assignments of assets to users 1216. Specifically, the asset storage 1308 may include asset ledger 1324, fiat currency ledger 1326, and/or other ledger(s) 1328, which can be used to record transfers of assets between users 1216 and/or one or more third parties (e.g., merchant network(s), payment card network(s), ACH network(s), equities network(s), the asset network, securities networks, etc.). In doing so, the asset storage 1308 can maintain a running balance of assets managed by the service provider system 1302. The ledger(s) of the asset storage 1308 can further indicate some of the running balance for individual ledger(s) stored in the asset storage 1308 are assigned or registered to one or more user account(s) 1310.

In at least one example, the asset storage 1308 can include transaction logs 1330, which can include, as transaction data, records of past transactions involving the service provider system 1302 and/or the user account 1310. In some examples, the data store(s) 1306 can store a private blockchain 1332. A private blockchain 1332 can function to record sender addresses, recipient addresses, public keys, values of cryptocurrency transferred, and/or can be used to verify ownership of cryptocurrency tokens to be transferred. In some examples, the service provider system 1302 can record transactions involving cryptocurrency until the number of transactions has exceeded a determined limit (e.g., number of transactions, storage space allocation, etc.). Based at least in part on determining that the limit has been reached, the service provider system 1302 can publish the transactions in the private blockchain 1332 to the public blockchain 1314 (e.g., associated with the asset network), where miners can verify the transactions and record the transactions to blocks on the public blockchain 1314. In at least one example, the service provider system 1302 can participate as miner(s) at least for transactions to which the respective platform is a party to, to be posted to the public blockchain 1314.

In some cases, the data store(s) 1306 can store and/or manage multiple user accounts, an example of which is described in relation to the user account 1310. In at least one example, the user account 1310 can include user account data 1334, which can include, but is not limited to, data associated with user identifying information (e.g., name, phone number, address, artist or band name, verified credentials, etc.), user identifier(s) (e.g., alphanumeric identifiers, etc.), user preferences (e.g., learned or user-specified), purchase history data (e.g., identifying one or more items purchased (and respective item information), subscription tier information, etc.), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1334 can include account activity 1336 and user wallet key(s) 1338. In some examples, the user wallet key(s) 1338 can include a public-private key-pair and a respective address associated with the asset network or other asset networks. In some examples, the user wallet key(s) 1338 may include one or more key pairs, which can be unique to the asset network or other asset networks.

In addition to the user account data 1334, the user account 1310 can include ledger(s) for account(s) managed by the service provider system 1302, for the user. For example, the user account 1310 may include an asset ledger 1324, a fiat currency ledger 1326, and/or one or more other ledgers 1328. The ledger(s) can indicate that a corresponding user utilizes the service provider system 1302 to manage corresponding accounts (e.g., a cryptocurrency account, a securities account, a fiat currency account, an artist account, etc.). It should be noted that in some examples, the ledger(s) can be logical ledger(s) and the data can be represented in a single database. In some examples, individual ones of the ledger(s), or portions thereof, can be maintained by the service provider system 1302.

In some examples, the asset ledger 1324 can store a balance for one or more cryptocurrencies (e.g., Bitcoin, Ethereum, Litecoin, etc.) registered to the user account 1310. In at least one example, the asset ledger 1324 can further record transactions of cryptocurrency assets associated with the user account 1310. For example, the user account 1310 can receive cryptocurrency from the asset network using the user wallet key(s) 1338. In some examples, the user wallet key(s) 1338 may be generated for the user upon request. User wallet key(s) 1338 can be requested by the user in order to send, exchange, or otherwise control the balance of cryptocurrency held by the service provider system 1302 (e.g., in the asset wallet 1322) and registered to the user. In some examples, the user wallet key(s) 1338 may not be generated until a user account requires such. This on-the-fly wallet key generation provides enhanced security features for users, reducing the number of access points to a user account's balance and, therefore, limiting exposure to external threats.

An account ledger can reflect a positive balance when funds are added to the corresponding account. An account can be funded by transferring currency in the form associated with the account from an external account (e.g., transferring a value of cryptocurrency to the service provider system 1302 and the value is credited as a balance in asset ledger 1324), by purchasing currency in the form associated with the account using currency in a different form (e.g., buying a value of cryptocurrency from the service provider system 1302 using a value of fiat currency reflected in fiat currency ledger 1326, and crediting the value of cryptocurrency in asset ledger 1324), or by conducting a transaction with another user (customer or merchant) of the service provider system 1302 wherein the account receives incoming currency (which can be in the form associated with the account or a different form, in which the incoming currency may be converted to the form associated with the account).

With specific reference to funding a cryptocurrency account, a user may have a balance of cryptocurrency stored in another cryptocurrency wallet. In some examples, the other cryptocurrency wallet can be associated with a third-party unrelated to the service provider system 1302 (i.e., an external account). Such a transaction can request that the user to transfer an amount of the cryptocurrency in a message signed by user's private key to an address provided by the service provider system 1302. In at least one example, the transaction can be sent to miners to bundle the transaction into a block of transactions and to verify the authenticity of the transactions in the block. Once a miner has verified the block, the block is written to the public blockchain 1314 where the service provider system 1302 can then verify that the transaction has been confirmed and can credit the user's asset ledger 1324 with the transferred amount. When an account is funded by transferring cryptocurrency from a third-party cryptocurrency wallet, an update can be made to the public blockchain 1314. In some cases, this update of the public blockchain 1314 need not take place at a time-critical moment, such as when a transaction is being processed by a merchant in store or online.

In some examples, a user can purchase cryptocurrency to fund their cryptocurrency account. In some examples, the user can purchase cryptocurrency through services offered by the service provider system 1302. As described above, in some examples, the service provider system 1302 can acquire cryptocurrency from a third-party source. In examples where the service provider system 1302 has its own cryptocurrency assets, cryptocurrency transferred in a transaction (e.g., data with address provided for receipt of transaction and a balance of cryptocurrency transferred in the transaction) can be stored in an asset wallet 1322 associated with the service provider system 1302. In at least one example, the service provider system 1302 can credit the asset ledger 1324 of the user. Additionally, while the service provider system 1302 recognizes that the user retains the value of the transferred cryptocurrency through crediting the asset ledger 1324, an inspection of the blockchain will show the cryptocurrency as having been transferred to the service provider system 1302. In some examples, the asset wallet 1322 can be associated with many different addresses. In such examples, an inspection of the blockchain may not necessarily associate all cryptocurrency stored in asset wallet 1322 as belonging to the same entity. The presence of a private ledger used for real-time transactions and maintained by the service provider system 1302, combined with updates to the public ledger at other times, allows for extremely fast transactions using cryptocurrency to be achieved. In some examples, the "private ledger" can refer to the asset ledger 1324, which in some examples, can utilize the private blockchain 1332, as described herein. The "public ledger" can correspond to the public blockchain 1314 associated with the asset network.

In at least one example, an asset ledger 1324, fiat currency ledger 1326, or the like associated with the user account 1310 can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1324. In some examples, a user can receive fiat currency or another currency in the form of payment for a transaction with another user. In at least one example, at least a portion of such funds can be converted into cryptocurrency by the service provider system 1302 and used to fund the asset ledger 1324 of the user.

In examples, a user can also have an account in U.S. dollars, which can be tracked, for example, via the fiat currency ledger 1326. Such an account can be funded by transferring money from a bank account at a third-party bank to an account maintained by the service provider system 1302 as is conventionally known. In some examples, a user can receive fiat currency in the form of payment for a transaction with another user. In such examples, at least a portion of such funds can be used to fund the fiat currency ledger 1326.

In some examples, a user can have one or more internal payment cards registered with the service provider system 1302. Internal payment cards can be linked to one or more of the accounts associated with the user account 1310. In some embodiments, options with respect to internal payment cards can be adjusted and managed using an application (e.g., the payment application 1226, a wallet application 1312, etc.).

In at least one example, the user account 1310 can be associated with the asset wallet accessible via a wallet application 1312 of the user device 1304, or a stored balance for use in payment transactions, peer-to-peer transactions, payroll payments, etc. In at least one example, the asset wallet 1322 can store data indicating an address provided for receipt of a cryptocurrency transaction. In at least one example, the balance of the asset wallet 1322 can be based at least in part on a balance of the asset ledger 1324. In at least one example, funds availed via the asset wallet 1322 can be stored in the asset wallet 1322. Funds availed via the asset wallet 1322 can be tracked via the asset ledger 1324. The asset wallet 1322, however, can be associated with additional cryptocurrency funds.

In at least one example, when the service provider system 1302 includes a private blockchain 1332 for recording and validating cryptocurrency transactions, the asset wallet 1322 can be used instead of, or in addition to, the asset ledger 1324. For example, a merchant can provide the address of the asset wallet 1322 for receiving payments. In an example where a customer is paying in cryptocurrency and the customer has their own cryptocurrency wallet account associated with the service provider system 1302, the customer can send a message signed by its private key including its wallet address (i.e., of the customer) and identifying the cryptocurrency and value to be transferred to the merchant's asset wallet 1322. The service provider system 1302 can complete the transaction by reducing the cryptocurrency balance in the customer's cryptocurrency wallet and increasing the cryptocurrency balance in the merchant's asset wallet 1322. In addition to recording the transaction in the respective cryptocurrency wallets, the transaction can be recorded in the private blockchain 1332, and the transaction can be confirmed. A user can perform a similar transaction with cryptocurrency in a peer-to-peer transaction as described above.

While the asset ledger 1324 and/or asset wallet 1322 are described above with reference to cryptocurrency, the asset ledger 1324 and/or asset wallet 1322 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider system 1302 is an aspect of the technology disclosed that enables technical advantages of increased processing speed and improved security.

The description of the environment 1300 above generally relates to a centralized service provider that at least partially facilitates storing and managing assets in the data store 1306. However, the environment 1300 may also facilitate decentralized storage and management of assets alternatively or in addition to centralized storage and management as described above. For instance, the environment 1300 may include a decentralized platform implemented using a plurality of nodes (e.g., web nodes), an example of which is illustrated as node 1316. The node 1316 is representative of a computer or other device tasked with validating transactions and/or maintaining a copy of a blockchain ledger, such as a ledger associated with the public blockchain 1314. The decentralized platform may be implemented via the environment 1300 through use of decentralized identifiers and verifiable credentials that are stored and managed by user devices 1304. A decentralized identifier is configured as a self-owned identifier that supports decentralized authentication and routing. A self-owned identifier in a blockchain network is a unique identifier that is owned and controlled by an individual entity on the blockchain, as contrasted with an entity controlled by a centralized authority (e.g., the service provider system 1302). The decentralized identity referenced by a decentralized identifier gives an entity control over what data can be accessed, stored, modified, and so forth by other entities, such as the service provider system 1302.

The node 1316, as representative of one of a plurality of decentralized nodes (e.g., decentralized web nodes), supports data storage and relays that allows entities, service provider systems, individuals, organizations and so forth to send, store, and receive encrypted or public messages and data. The node 1316 is universally addressable and is "crawlable" using data addressing in relation to the decentralized identifiers. The node 1316 is also configured to support decentralized replication of data across the nodes that is consistent across multiple nodes over time through continued data communication between the nodes in the decentralized platform. The node 1316 is configurable to support secure encryption through use of a cryptographic key associated with an individual's decentralized identifier and support semantic discovery to discover different forms of published data.

Verifiable credentials are an open standard for digital credentials and employ a data format for cryptographic presentation and verification of claims. A verifiable credential represents an indication of trust of a piece of information related to an entity. For example, a verifiable credential indicates that the issuer of the verifiable credential trusts the holder of the verifiable credential; the holder trusts a verifier of the verifiable credential; and that the verifier trusts the issuer. Verifiable credentials may be issued by anyone, about anything, and can be presented to and verified by everyone granted access to the verifiable credential. Accordingly, a user of the user device 1304 may be an issuer, a holder, and/or a verifier, as can the service provider system 1302.

In some examples, the user device 1304 may implement a wallet application 1312 configured to manage decentralized identifiers and/or verifiable credentials. For instance, the wallet application 1312 may provide a user interface for implementation of access controls to various data associated with the decentralized identifier by the service provider system 1302, to other user devices, and so forth. Additionally, the wallet application 1312 may be configured to provide functionality for resource transfers (e.g., cryptocurrency, fiat currency, etc.) with the service provider system 1302, other user devices, and the like, based on techniques described herein.

In some examples, the hardware wallet 1318 may store cryptocurrency assets in combination with the wallet application 1312 and the service provider system 1302. For instance, the hardware wallet 1318, the wallet application 1312, and the service provider system 1302 may store a respective, different private key, where a transaction with the cryptocurrency assets is signed by at least two of the three private keys. The user interface provided by the wallet application 1312 may allow a user to request a transaction. The wallet application 1312 may then sign the transaction with the private key of the wallet application 1312, have either the hardware wallet 1318 or the service provider system 1302 use a second of the three private keys to sign the transaction, and then provide the transaction with two signatures to the public blockchain 1314 for processing.

FIG. 14 depicts an illustrative block diagram illustrating a system 1400 for performing search ranking media content items techniques described herein. The system 1400 includes a user device 1402, that communicates with server computing device(s) (e.g., server(s) 1404) via network(s) 1406 (e.g., the Internet, cable network(s), cellular network (s), cloud network(s), wireless network(s) (e.g., Wi-Fi) and wired network(s), as well as close-range communications such as Bluetooth®, Bluetooth® low energy (BLE), and the like). While a single user device 1402 is illustrated, in additional or alternate examples, the system 1400 can have multiple user devices, as described above with reference to FIG. 12.

In the context of the previously described figures, for example, the server(s) 1404 and/or the user device 1402 may be used to implement the media content platform 126 and/or various portions of the media content service provider system 102.

In at least one example, the user device 1402 can be any suitable type of computing device, e.g., portable, semi-portable, semi-stationary, or stationary. Some examples of the user device 1402 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, a speaker device, an automobile or other vehicle type, an Internet of Things (IoT) device, etc. That is, the user device 1402 can be any computing device capable of sending communications and performing the functions according to the techniques described herein. The user device 1402 can include devices, e.g., payment card readers, or components capable of accepting payments, as described below. The user device 1402 may be representative of, and provide functionality for, the user devices 1206 described in relation to FIG. 12.

In the illustrated example, the user device 1402 includes one or more processors 1408, one or more computer-readable media 1410, one or more communication interface(s) 1412, one or more input/output (I/O) devices 1414, a display 1416, and sensor(s) 1418. The user device 1402 is also configurable to include one or more encoders and one or more decoders.

In at least one example, a processor 1408 can itself comprise one or more processors or processing cores. For example, the processor(s) 1408 can be implemented as one or more microprocessors, microcomputers, microcontrollers, digital signal processors, central processing units, state machines, logic circuitries, and/or any devices that manipulate signals based on operational instructions. In some examples, the processor(s) 1408 can be one or more hardware processors and/or logic circuits of any suitable type specifically programmed or configured to execute the algorithms and processes described herein. The processor(s) 1408 can be configured to fetch and execute computer-readable processor-executable instructions stored in the computer-readable media 1410.

Depending on the configuration of the user device 1402, the computer-readable media 1410 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1410 can include, but is not limited to, RAM, ROM, EEPROM, flash memory, solid-state storage, magnetic disk storage, optical storage, and/or other computer-readable media technology. Further, in some examples, the user device 1402 can access external storage, such as RAID storage systems, storage arrays, network attached storage, storage area networks, cloud storage, or any other medium that can be used to store information and that can be accessed by the processor(s) 1408 directly or through another computing device or network. Accordingly, the computer-readable media 1410 can be computer storage media able to store instructions, components or components that can be executed by the processor(s) 1408. Further, when mentioned, non-transitory computer-readable media exclude media such as energy, carrier signals, electromagnetic waves, and signals per se.

The computer-readable media 1410 can be used to store and maintain any number of functional components that are executable by the processor(s) 1408. In some implementations, these functional components comprise instructions or programs that are executable by the processor(s) 1408 and that, when executed, implement operational logic for performing the actions and services attributed above to the user device 1402. Functional components stored in the computer-readable media 1410 can include a user interface 1420 to enable users to interact with the user device 1402, and thus the server(s) 1404 and/or other networked devices, such as the user interfaces as described with reference to FIGS. 4 through 9. In at least one example, a user can interact with the user interface via touch input, spoken input, gesture, or any other type of input. The word "input" is also used to describe "contextual" input that may not be directly provided by the user via the user interface 1420. For example, user's interactions with the user interface 1420 are analyzed using, e.g., natural language processing techniques, user movement tracking techniques, eye tracking techniques, etc. to determine context or intent of the user, which may be treated in a manner similar to "direct" user input.

Depending on the type of the user device 1402, the computer-readable media 1410 can also optionally include other functional components and data, such as other components and data 1422, which can include programs, drivers, etc., and the data used or generated by the functional components. In addition, the computer-readable media 1410 can also store data, data structures and the like, that are used by the functional components. Further, the user device 1402 can include many other logical, programmatic, and physical components, of which those described are merely examples that are related to the discussion herein.

In at least one example, the computer-readable media 1410 can include additional functional components, such as an operating system 1424 for controlling and managing various functions of the user device 1402 and for enabling user interactions.

The communication interface(s) 1412 can include one or more interfaces and hardware components for enabling communication with various other devices, such as over the network(s) 1406 or directly. For example, communication interface(s) 1412 can enable communication through one or more network(s) 1406, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1406 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1402 can further include one or more input/output (I/O) devices 1414. The I/O devices 1414 can include speakers, a microphone, a camera, and various user controls (e.g., buttons, a joystick, a keyboard, a keypad, etc.), a haptic output device, and so forth. The I/O devices 1414 can also include attachments that leverage the accessories (audio-jack, USB-C, Bluetooth, etc.) to connect with the user device 1402.

In at least one example, user device 1402 can include a display 1416. Depending on the type of computing device(s) used as the user device 1402, the display 1416 can employ any suitable display technology. For example, the display 1416 can be a liquid crystal display, a plasma display, a light emitting diode display, an OLED (organic light-emitting diode) display, an electronic paper display, or any other suitable type of display able to present digital content thereon. In at least one example, the display 1416 can be an augmented reality display, a virtual reality display, or any other display able to present and/or project digital content. In some examples, the display 1416 can have a touch sensor associated with the display 1416 to provide a touchscreen display configured to receive touch inputs for enabling interaction with a graphic interface presented on the display 1416. Accordingly, implementations herein are not limited to any particular display technology. In some examples, the user device 1402 may not include the display 1416, and information can be presented by other means, such as aurally, haptically, etc.

In addition, the user device 1402 can include sensor(s) 1418. The sensor(s) 1418 can include a global positioning system ("GPS") device able to indicate location information. Further, the sensor(s) 1418 can include, but are not limited to, an accelerometer, gyroscope, compass, proximity sensor, camera, microphone, and/or a switch.

In some examples, the GPS device can be used to identify a location of a user. In at least one example, the location of the user can be used by the seller platform 1210, the P2P platform 1212, and/or the media content platform 1214, described above, to provide one or more services. That is, in some examples, the service provider can implement geofencing to provide particular services to users by the seller platform 1210, the P2P platform 1212, and/or the media content platform 1214.

In examples, the user device 1402 includes a codec system, which may comprise an encoder and/or a decoder. The encoder is configured to encode a data stream or signal from an analog signal (e.g., an analog audio signal, an analog video signal, etc.) to a digital signal for transmission or storage. The decoder is configured to convert the digital signal back to an analog signal, such as for playback or editing. In some cases, the encoder may be configured to encode the data stream or analog signal in an encrypted format, and the decoder may accordingly be configured to decrypt the digital signal as part of the decoding process (e.g., using a cryptographic key). Additionally, in some examples, the encoder may compress data to reduce transmission bandwidth and/or storage space for the digital signal. One example of a compression codec system is a lossless codec, in which the digital data stream is a compressed format of the original data stream but retains the information present in the original data stream. Another example of a compression codec system is a lossy codec which reduces the quality of the digital data stream but can increase the compression of the data stream relative to lossless codec systems. The codec system comprising the encoder and/or the decoder may be specialized to accomplish various different objectives, such as to preserve motion, preserve color, minimize latency, maintain fidelity, minimize bit-rate, optimize for different output device types, maintain synchronization of audio and video (e.g., using a metadata synchronization data stream), and so on. Although not explicitly illustrated in the example system 1400, the server 1404 may include an encoder and/or a decoder as well.

Additionally, the user device 1402 can include various other components that are not shown, examples of which include removable storage, a power source, such as a battery and power control unit, a barcode scanner, a printer, a cash drawer, and so forth.

In addition, as described in relation to FIG. 12, the user device 1402 can include, be connectable to, or otherwise be coupled to a reader device 1426, for reading payment instruments and/or identifiers associated with payment objects. The reader device 1426 can include a read head for reading a magnetic strip of a payment card, and further can include encryption technology for encrypting the information read from the magnetic strip. Additionally or alternatively, the reader device 1426 can be an EMV payment reader, which in some examples, can be embedded in the user device 1402. Moreover, numerous other types of readers can be employed with the user device 1402 herein, depending on the type and configuration of the user device 1402.

The reader device 1426 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data from various types of payment instruments. Accordingly, the reader device 1426 may include hardware implementation, such as slots, magnetic tracks, and rails with one or more sensors or electrical contacts to facilitate detection and acceptance of a payment instrument. That is, the reader device 1426 may include hardware implementations to enable the reader device 1426 to interact with a payment instrument via a swipe, a dip, or a tap to obtain payment data associated with a customer. Additionally, or optionally, the reader device 1426 may also include a biometric sensor to receive and process biometric characteristics and process them as payment instruments, given that such biometric characteristics are registered with the payment service and connected to a financial account with a bank server. The reader device 1426 may include processing unit(s), computer-readable media, a reader chip, a transaction chip, a timer, a clock, a network interface, a power supply, and so on. That is, the reader device 1426 may include any of the computing components described herein with reference to the user device 1402 to implement the functionality provided by the reader device 1426.

In examples, the reader device 1426 includes a reader chip, which may perform functionality to control the power supply, among other functionality of the reader device 1426. The power supply may include one or more power supplies such as a physical connection to AC power or a battery. Power supply may include power conversion circuitry for converting AC power and generating a plurality of DC voltages for use by components of reader device 1426. When power supply includes a battery, the battery may be charged via a physical power connection, via inductive charging, or via any other suitable method.

The reader device 1426 may also include a transaction chip that may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. The transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1402, which can be a POS terminal, and the reader device 1426 are shown as separate devices, in additional or alternative examples, the user device 1402 and the reader device 1426 can be part of a single device, which may be a battery-operated device. In some examples, the reader device 1426 can have a display integrated therewith, which can be in addition to (or as an alternative of) the display 1416 associated with the user device 1402.

The server(s) 1404 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1404 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1404 can be located together or separately, and organized, for example, as virtual servers, server banks and/or server farms. The described functionality can be provided by the servers of a single merchant or enterprise or can be provided by the servers and/or services of multiple different customers or enterprises.

In the illustrated example, the server(s) 1404 can include one or more processors 1428, one or more computer-readable media 1430, one or more I/O devices 1432, and one or more communication interfaces 1434. A processor 1428 can be a single processing unit or a number of processing units and can include single or multiple computing units or multiple processing cores. The processor(s) 1428 can be implemented as one or more microprocessors, microcomputers, microcontrollers, digital signal processors, central processing units, state machines, logic circuitries, and/or any devices that manipulate signals based on operational instructions. For example, the processor(s) 1428 can be one or more hardware processors and/or logic circuits of any suitable type specifically programmed or configured to execute the algorithms and processes described herein. The processor(s) 1428 can be configured to fetch and execute computer-readable instructions stored in the computer-readable media 1430, which can program the processor(s) 1428 to perform the functions described herein.

The computer-readable media 1430 can include volatile and nonvolatile memory and/or removable and non-removable media implemented in any type of technology for storage of information, such as computer-readable instructions, data structures, program components, or other data. Such computer-readable media 1430 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1404, the computer-readable media 1430 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1430 can be used to store any number of functional components that are executable by the processor(s) 1428. In many implementations, these functional components comprise instructions or programs that are executable by the processors 1428 and that, when executed, specifically configure the one or more processors 1428 to perform the actions attributed above to the seller platform 1210, the P2P platform 1212, and/or the media content platform 1214. Functional components stored in the computer-readable media 1430 can optionally include a merchant component 1436, a training component 1438, and one or more other components and data 1440. The computer-readable media 1430 can additionally include an operating system 1442 for controlling and managing various functions of the server(s) 1404.

The merchant component 1436 can be configured to receive transaction data from POS systems, such as the POS system 1224 described above with reference to FIG. 12. The merchant component 1436 can transmit requests (e.g., authorization, capture, settlement, etc.) to payment service server computing device(s) to facilitate POS transactions between merchants and customers. The merchant component 1436 can communicate the successes or failures of the POS transactions to the POS systems.

The training component 1438 can be configured to train models using machine-learning mechanisms, as well as retrain the models to improve outputs provided by the models based on feedback received over time. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1402 and/or the server(s) 1404 for use at a time after the data models have been trained (e.g., at runtime).

The one or more other components and data 1440 can include functionality of which is described above. Further, the one or more other components and data 1440 can include programs, drivers, etc., and the data used or generated by the functional components. Further, the server(s) 1404 can include many other logical, programmatic, and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile, or non-volatile memory for a computing device), hardware, or firmware (or any combination thereof) components. Modules are typically functional such that they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize an SDK to integrate third-party service provider functionality into its applications. That is, API(s) and/or SDK(s) can enable third-party developers to customize how their respective third-party applications interact with the service provider or vice versa.

The communication interface(s) 1434 can include one or more interfaces and hardware components for enabling communication with various other devices, such as over the network(s) 1406 or directly. For example, communication interface(s) 1434 can enable communication through one or more network(s) 1406, which can include, but are not limited any type of network known in the art, as described herein.

The server(s) 1404 can further be equipped with various I/O devices 1432. Such I/O devices 1432 can include a display, various user interface controls (e.g., buttons, joystick, keyboard, mouse, touch screen, biometric or sensory input devices, etc.), audio speakers, connection ports and so forth.

In at least one example, the system 1400 can include a datastore 1444 that can be configured to store data that is accessible, manageable, and updatable. In some examples, the datastore 1444 can be integrated with the user device 1402 and/or the server(s) 1404. In other examples, as shown in FIG. 14, the datastore 1444 can be located remotely from the server(s) 1404 and can be accessible to the server(s) 1404. The datastore 1444 can comprise multiple databases and/or servers connected locally and/or remotely via the network(s) 1406. In at least one example, the datastore 1444 can store user profiles, which can include merchant profiles, customer profiles, artist profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, media content consumption data (e.g., number of streams of media content and by which artists, direct artist payouts, playlists generated or "favorited," durations of listening and/or watching individual media content items, actions performed while consuming media content (e.g., skips, repeats, volume changes, etc.), locations at which media content is consumed, devices used to consume media content, activities during which media content is consumed, etc.), etc.

Artist profiles can store data including, but not limited to, artist information (e.g., artist's performance or stage name, band name, artist's legal name, record label, phone number, address, social media handles, website address, banking information, etc.), artist preferences (e.g., learned or artist-specified), media content (and/or associated data) at least partially attributed to the artist (e.g., songs, videos, artists in a same genre or having shared listeners, etc.), event data (e.g., tour dates, appearance dates, appointments, etc.), financial data (e.g., advance data, recoupment data, royalty data, payouts data, etc.), payroll data (e.g., employees, contractors, venues, payroll frequency, etc.), listening data (e.g., number of streams on media content platform(s), listening trends, etc.), fan data (number of followers on media content platform(s), number of followers on social media platform(s), etc.), reservations data (e.g., venue reservations, studio recording reservations, previous reservations, upcoming (scheduled) reservations, reservation duration, interactions associated with such reservations, etc.), inventory data (e.g., merchandise inventory), customer service data, and so forth.

Furthermore, in at least one example, the datastore 1444 can store inventory database(s) and/or catalog database(s). As described above, an inventory can store data associated with a quantity of various items that a merchant has available to the merchant. Furthermore, a catalog can store data associated with items that a merchant has available for acquisition. The datastore 1444 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described in the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The phrases "in some examples," "according to various examples," "in the examples shown," "in one example," "in other examples," "various examples," "some examples," and the like generally mean the particular feature, structure, or characteristic following the phrase is included in at least one example of the present invention and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:
receiving, by a media content platform, a media content item previously absent from a media content library of the media content platform, the media content item associated with an artist popularity value of an artist of the media content item;
estimating, based on an elapsed duration after receiving the media content item satisfying a threshold duration, a popularity value of the media content item based on the artist popularity value and one or more album popularity values for one or more albums of the artist released prior to the media content item, the one or more album popularity values being weighted based on a recency of release of the one or more albums by the artist;
receiving, from a user account of the media content platform, a search request corresponding to at least one media content item of the media content library; and
populating one or more search results in response to the search request, the one or more search results including the media content item and one or more additional media content items ranked based on the estimated popularity value of the media content item and respective current popularity values of the one or more additional media content items.

2. The method of claim 1, wherein estimating the popularity value of the media content item further comprises applying, for the threshold duration, a decay factor to the estimated popularity value, the decay factor based on the elapsed duration.

3. The method of claim 2, wherein the decay factor is applied after an initial elapsed duration, the initial elapsed duration being subsequent to receiving the media content item.

4. The method of claim 2, further comprising obtaining a current popularity value of the media content item, the current popularity value based on a numerical quantity of searches for the media content item, wherein the threshold duration corresponds to the elapsed duration when the current popularity value is within a threshold amount of the estimated popularity value.

5. The method of claim 2, wherein the threshold duration corresponds to the elapsed duration when the estimated popularity value is within a threshold value of zero.

6. The method of claim 1, further comprising removing, from the one or more search results prior to populating the one or more search results, invalid media content items based on a respective artist popularity value of artists of the invalid media content items satisfying a threshold value, or a respective current popularity value of the invalid media content items being greater than or equal to a respective estimated popularity value of the invalid media content items.

7. The method of claim 1, further comprising accessing a database associated with the media content platform to obtain the artist popularity value of the artist of the media content item.

8. The method of claim 7, further comprising determining that the artist popularity value is within a threshold value of zero based on the database failing to include the artist.

9. The method of claim 7, further comprising accessing the database to obtain an additional artist popularity value of an additional artist associated with the media content item prior to accessing the database to obtain the artist popularity value of the artist, wherein:

accessing the database to obtain the artist popularity value is based on the database failing to include the artist;

the additional artist is a primary artist of the media content item; and the artist is at least one of a secondary artist of the media content item, a producer of the media content item, or a writer of the media content item.

10. The method of claim 1, further comprising storing, at a database associated with the media content platform, the estimated popularity value of the media content item, wherein populating the one or more search results is based on accessing the database to obtain the estimated popularity value of the media content item.

11. The method of claim 1, wherein the media content item is associated with multiple artists, the method further comprising selecting the artist from the multiple artists based on comparing respective artist popularity values for the multiple artists, the artist popularity value having a greatest value of the respective artist popularity values.

12. The method of claim 1, further comprising:

receiving an additional search request to search for the media content item, wherein the elapsed duration after receiving the media content item fails to satisfy the threshold duration when the additional search request is received;

accessing a database associated with the media content platform to obtain respective current popularity values for the media content item and the one or more additional media content items based on the elapsed duration failing to satisfy the threshold duration; and populating one or more additional search results in response to the additional search request, the one or more additional search results including the media content item and the one or more additional media content items ranked based on the respective current popularity values.

13. The method of claim 1, wherein the estimated popularity value is based on user interaction with one or more of media content items associated with the artist, the one or more albums, or media content items associated with a genre of the media content item.

14. A system comprising:

a processing device; and a computer-readable storage medium storing instructions that, responsive to execution by the processing device, causes the processing device to perform operations including:

receiving, by a media content platform, a media content item previously absent from a media content library of the media content platform, the media content item associated with an artist popularity value of an artist of the media content item;

estimating, based on an elapsed duration after receiving the media content item satisfying a threshold duration, a popularity value of the media content item based on the artist popularity value and one or more album popularity values for one or more albums of the artist released prior to the media content item, the one or more album popularity values being weighted based on a recency of release of the one or more albums by the artist;

receiving, from a user account of the media content platform, a search request corresponding to at least one media content item of the media content library; and populating one or more search results in response to the search request, the one or more search results including the media content item and one or more additional media content items ranked based on the estimated popularity value of the media content item and respective current popularity values of the one or more additional media content items.

15. The system of claim 14, wherein estimating the popularity value of the media content item further comprises applying, for the threshold duration, a decay factor to the estimated popularity value, the decay factor based on the elapsed duration.

16. The system of claim 14, wherein the operations further comprise storing, at a database associated with the media content platform, the estimated popularity value of the media content item, wherein populating the one or more search results is based on accessing the database to obtain the estimated popularity value of the media content item.

17. A non-transitory computer-readable medium having computer-readable instructions stored thereon that, upon execution by a processor, cause the processor to perform or control performance of operations that comprise:

receiving, by a media content platform, a media content item previously absent from a media content library of the media content platform, the media content item associated with an artist popularity value of an artist of the media content item;

estimating, based on an elapsed duration after receiving the media content item satisfying a threshold duration, a popularity value of the media content item based on the artist popularity value and one or more album popularity values for one or more albums of the artist released prior to the media content item, the one or more album popularity values being weighted based on a recency of release of the one or more albums by the artist;

receiving, from a user account of the media content platform, a search request corresponding to at least one media content item of the media content library; and populating one or more search results in response to the search request, the one or more search results including the media content item and one or more additional media content items ranked based on the estimated popularity value of the media content item and respective current popularity values of the one or more additional media content items.

18. The computer-readable medium of claim 17, wherein estimating the popularity value of the media content item comprises applying, for the threshold duration, a decay factor to the estimated popularity value, the decay factor based on the elapsed duration.

19. The computer-readable medium of claim 18, wherein the decay factor is applied after an initial elapsed duration, the initial elapsed duration being subsequent to receiving the media content item.

20. The computer-readable medium of claim 17, wherein the operations further comprise obtaining a current popularity value of the media content item, the current popularity value based on a numerical quantity of searches for the media content item, wherein the threshold duration corresponds to the elapsed duration when the current popularity value is within a threshold amount of the estimated popularity value.

\* \* \* \* \*